United States Patent
Shin et al.

(10) Patent No.: US 10,129,336 B2
(45) Date of Patent: Nov. 13, 2018

(54) CONTENT MANAGEMENT METHOD AND CLOUD SERVER THEREFOR

(71) Applicant: SAMSUNG ELECTRONIC CO., LTD., Suwon-si (KR)

(72) Inventors: Hyun-jae Shin, Seoul (KR); Won-Keun Kong, Suwon-si (KR); Yong-hyun Lim, Suwon-si (KR); Min-Jeong Kang, Suwon-si (KR); Moon-joo Lee, Suwon-si (KR)

(73) Assignee: SAMSUNG ELECTRONIC CO., LTD., Suwon-si (KR)

( * ) Notice: Subject to any disclaimer, the term of this patent is extended or adjusted under 35 U.S.C. 154(b) by 603 days.

(21) Appl. No.: 14/656,271

(22) Filed: Mar. 12, 2015

(65) Prior Publication Data

US 2015/0261775 A1    Sep. 17, 2015

(30) Foreign Application Priority Data

Mar. 12, 2014  (KR) .................. 10-2014-0029263

(51) Int. Cl.
*G06F 7/00* (2006.01)
*H04L 29/08* (2006.01)
*G06F 17/30* (2006.01)

(52) U.S. Cl.
CPC ...... *H04L 67/1097* (2013.01); *G06F 17/3012* (2013.01); *G06F 17/30126* (2013.01)

(58) Field of Classification Search
USPC ........................................ 707/821
See application file for complete search history.

(56) References Cited

U.S. PATENT DOCUMENTS

| 8,166,034 B2 | 4/2012 | Tsukagoshi et al. |
| 9,667,888 B2 * | 5/2017 | Shimosato ............. H04N 5/272 |
| 2003/0200193 A1 | 10/2003 | Boucher |
| 2004/0230966 A1 * | 11/2004 | Morris ............. G06F 17/30067 |
| | | 717/169 |
| 2006/0248111 A1 | 11/2006 | Park |
| 2007/0239435 A1 | 10/2007 | Stuhec |
| 2007/0294273 A1 | 12/2007 | Bendeck et al. |
| 2008/0012960 A1 | 1/2008 | Uchiyama |

(Continued)

FOREIGN PATENT DOCUMENTS

| JP | 2008-097244 A | 4/2008 |
| JP | 2009-266283 A | 11/2009 |

(Continued)

OTHER PUBLICATIONS

Communication dated Apr. 30, 2015 issued by the International Searching Authority in counterpart International Application No. PCT/KR2015/002389.

(Continued)

*Primary Examiner* — Cheyne D Ly
(74) *Attorney, Agent, or Firm* — Sughrue Mion, PLLC

(57) ABSTRACT

A method of managing data by a server includes receiving, from a client device, a signal that requests for a content list corresponding to a user account; selecting a content related to the user account and a file name generation rule corresponding to the user account; generating a file name of the content based on the file name generation rule; and providing the content list including the file name of the content to the client device.

20 Claims, 25 Drawing Sheets

(56) References Cited

U.S. PATENT DOCUMENTS

| | | | |
|---|---|---|---|
| 2008/0068469 A1* | 3/2008 | Takagi | G11B 27/322 348/231.2 |
| 2009/0210463 A1* | 8/2009 | Niwata | G06F 17/30067 |
| 2010/0003010 A1* | 1/2010 | Kim | H04N 5/772 386/224 |
| 2012/0072566 A1 | 3/2012 | Cho et al. | |
| 2013/0129142 A1 | 5/2013 | Miranda-Steiner | |
| 2013/0318048 A1 | 11/2013 | Rajabi et al. | |
| 2014/0067883 A1 | 3/2014 | Fujita | |

FOREIGN PATENT DOCUMENTS

| | | |
|---|---|---|
| JP | 4859348 B2 | 1/2012 |
| KR | 10-1272656 B1 | 6/2013 |

OTHER PUBLICATIONS

Anonymous, "EML Enhancer Tool to Rename EML Files with a Detailed File Name", Oct. 6, 2010, 2 pages total, XP055051529, http://web.archive.org/web/20101006023202/http://www.softspire.com/eml-enhancer.html.
Communication dated Jun. 16, 2017, issued by the European Patent Office in counterpart European Patent Application No. 15761824.0.
Communication dated May 23, 2018, issued by the European Patent Office in counterpart European Patent Application No. 15761824.0.

\* cited by examiner

FIG. 6

| Metadata | contents | content 1 | content 2 | content 3 | content 4 | content 5 | ... |
|---|---|---|---|---|---|---|---|
| CONTENT ATTRIBUTE INFORMATION (610) | OBJECT | User 1, User 2, Dog, cake | Room furniture | Actor 1, Actor 2 | Car 1, Car 2 | Shark, Rays | ... |
| | TYPE | Photo image | Web page | Movie | video | video | ... |
| | TIME | 2012.5.3 15:13 | 2012.3.4 14:34 | 2013.2.10 10:40 | 2013.1.6 15:25 | 2013.7.9 22:30 | ... |
| | PLACE | beach | home | White house | highway | aquarium | ... |
| | EVENT | Birthday party 15:13 | Interior decoration | Meeting | Car accident | sightseeing | ... |
| | RUNNING TIME | – | – | 5 minutes | 3 minutes | 10 minutes | ... |
| CONTEXT INFORMATION (620) | WEATHER | cloudy | cloudy | Rain | Cold & snow | fine | ... |
| | TEMPERATURE | 20°C | 16°C | 10°C | -10°C | 25°C | ... |
| | COLLECTING DEVICE | Mobile phone | tablet | TV | Black boxes | HMD (e.g., Glasses) | ... |
| | LOCATION OF OF DEVICE | seaside villa | Office (Seoul) | home | Car (highway) | Jeju Island | ... |
| | COLLECTING METHOD | User interaction | User interaction | User interaction | monitoring | User interaction | ... |
| | USER'S SCHEDULE | My birthday party | Move into a new house | vacation | Business trip | Family tour | ... |
| | ... | ... | ... | ... | ... | ... | |

FIG. 11
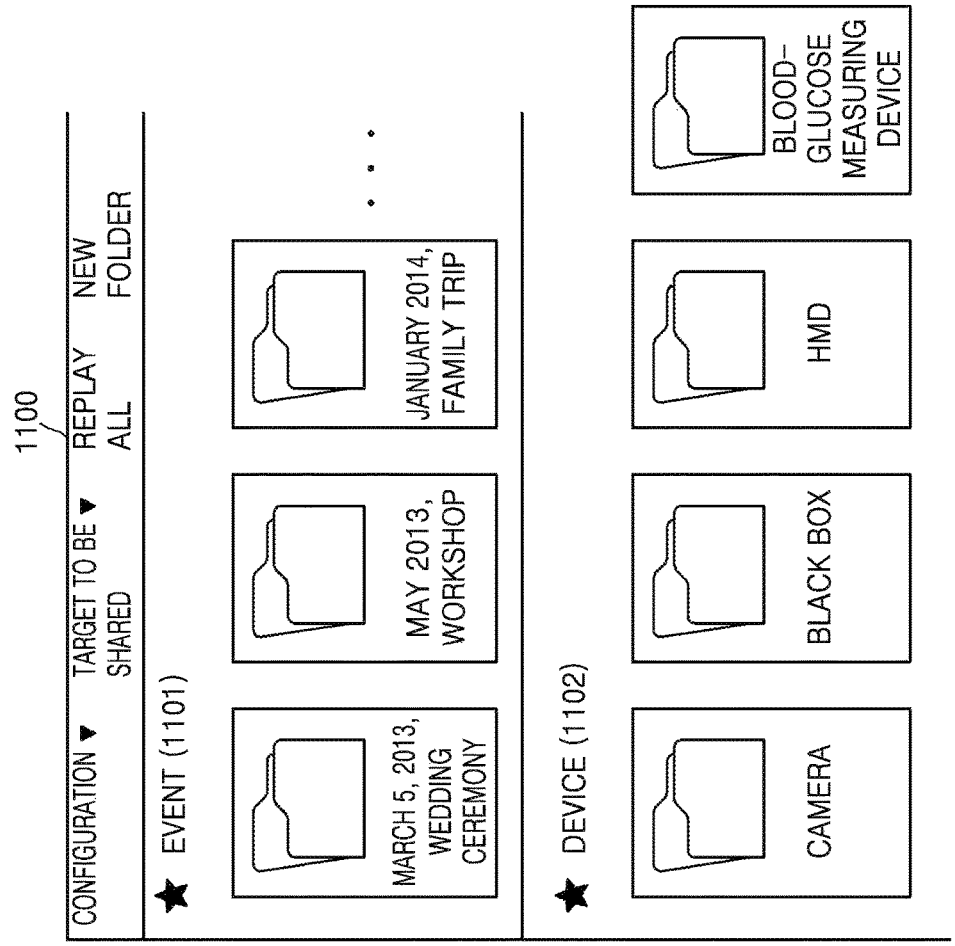
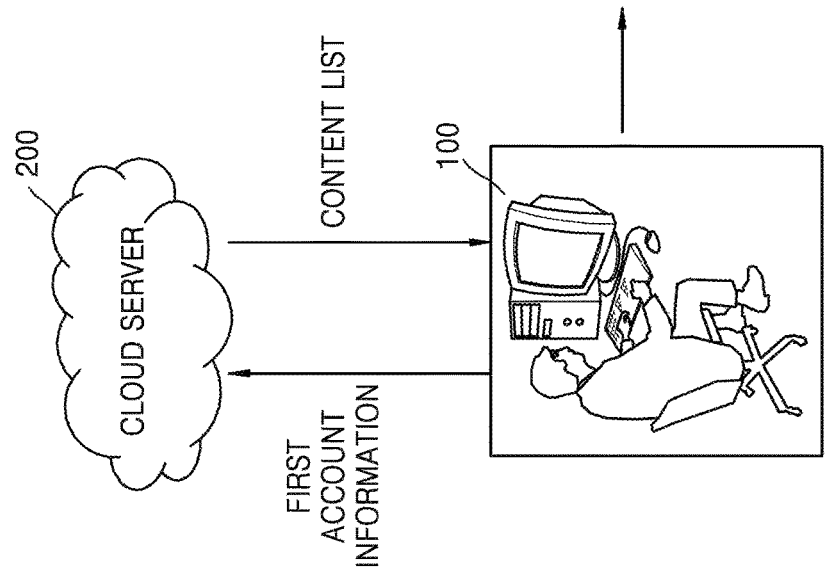

CONTENT MANAGEMENT METHOD AND CLOUD SERVER THEREFOR

CROSS-REFERENCE TO RELATED APPLICATION

This application claims priority from Korean Patent Application No. 10-2014-0029263, filed on Mar. 12, 2014 in the Korean Intellectual Property Office, the disclosure of which is incorporated herein in its entirety by reference.

BACKGROUND

1. Field

Apparatuses and methods consistent with exemplary embodiments relate to managing content obtained from at least one device and a cloud server therefor.

2. Description of the Related Art

Mobile terminals may be configured to perform various functions. Examples of the various functions include data and voice communication, taking a photograph or a moving image via a camera, voice storing, reproducing a music file via a speaker system, and displaying an image or a video. Some mobile terminals may have an additional function of reproducing games, and other mobile terminals may be realized as multimedia devices.

In addition, users may want to record location information of a mobile terminal, photographs, and the amount of exercise measured by the mobile terminal, beyond simple storing of memos or photographs in the mobile device. That is, a smartphone has been considered as a device for recording one's daily life and sharing memories with others, and thus, a service for systematically arranging records (for example, content) obtained from hobbies, leisure activities, and workouts of users is necessary.

SUMMARY

One or more exemplary embodiments provide a method of managing content, which provides a content list including file names generated by a cloud server based on analysis information of content to a device, and a cloud server therefor.

One or more exemplary embodiments provide a method of managing content, which provides different types of file names of according to users according to account information of the users from a cloud server, grouping the content automatically based on analysis information of the content, and storing the content after distributing pieces of content to a plurality of storage spaces, and a cloud server therefor.

According to an aspect of an exemplary embodiment, there is provided a method of managing data by a server including: receiving, from a client device, a signal that requests for a content list corresponding to a user account; selecting a content related to the user account and a file name generation rule corresponding to the user account; generating a file name of the content based on the file name generation rule; and providing the content list including the file name of the content to the client device.

The method may further include: receiving the file name generation rule from another device in connection with the user account; associating the file name generation rule with the user account; and storing information that indicates the file generation rule is associated with the user account.

The file name generation rule may further include at least one selected from information about a file name length, information about items to be included in the file name, and information about an order of the items included in the file name.

The method may further include receiving, from the client device, a signal that requests for changing the file name generation rule to a new file name generation rule; and updating the file name of the content included in the content list based on the new file name generation rule.

The generating of the file name may include generating the file name of the content by using analysis information about the content, wherein the analysis information is stored in advance.

The analysis information may include at least one selected from attribute information extracted from the content, information about a device collecting the content, environmental information when the content is obtained, and user information corresponding to the user account information.

The method may further include: receiving the content from another device in connection with the user account; obtaining the analysis information about the content by analyzing the content; and storing the analysis information about the content.

The content may include at least one selected from a still image content, a video content, an audio content, and a body measurement content.

The another device in connection with the user account may include at least one selected from a mobile terminal, a black box, a wearable device, a closed circuit television (CCTV), and a health information measuring device.

The obtaining of the analysis information may include obtaining the analysis information by using information collected by a plurality of devices in connection with the user account.

The information collected by the plurality of devices may include at least one piece of information selected from velocity information, luminance information, health information of a user of the user account, schedule information of the user, and social networking service (SNS) information of the user.

The providing of the content list may include: obtaining a thumbnail image corresponding to the content; and providing the content list including the file name and the thumbnail image to the client device.

The providing of the content list may include: classifying the content into at least one group according to a criterion that is set in advance; and generating a folder corresponding to the at least one group in the content list.

The method may further include: receiving a search word from the client device; selecting a content corresponding to the search word and in connection with the user account information; and providing a content list including a file name of the content corresponding to the search word to the client device.

The method may further include: receiving selection information for selecting one file name from the content list from the client device; and transmitting the content corresponding to the selected file name to the client device.

The method may further include providing the content to a storage space corresponding to a user account of a person included in the content or to a device of the person included in the content.

The method may further include storing the content in a storage space corresponding to another user account in connection with the user account.

The another account may include account information of a second user who authorizes that a first user of the user account and the second user of the another account share the storage space.

According to an aspect of an exemplary embodiment, there is provided a server including: a receiver configured to receive, from a client device, a signal that requests for a content list corresponding to a user account; a controller configured to select a content related to the user account and a file name generation rule corresponding to the user account, and generate a file name of the content based on the file name generation rule; and a transmitter configured to provide the content list including the file name of the content to the first device.

The receiver may be further configured to receive the file name generation rule from another device in connection with the user account, and the controller may be further configured to map the file name generation rule with the user account and store the mapped information in a storage.

The receiver may be further configured to receive, from the client device, a signal that requests for changing the file name generation rule to a new file name generation rule, and the controller may be further configured to update the file name of the content included in the content list based on the new file name generation rule.

The controller may be further configured to generate the file name of the content by using analysis information about the content, wherein the analysis information is stored in advance.

The receiver may be further configured to receive the content from another device in connection with the user account, and the controller may be further configured to obtain the analysis information about the content by analyzing the content and store the analysis information about the content in the storage.

The controller may be further configured to obtain the analysis information by using information collected by a plurality of devices in connection with the user account.

The controller may be further configured to obtain a thumbnail image corresponding to the content, and the transmitter may be further configured to provide the content list including the file name and the thumbnail image to the client device.

The controller may be further configured to classify the content into at least one group according to a criterion set in advance, and generate a folder corresponding to the at least one group in the content list.

The receiver may be further configured to receive a search word from the client device, and the controller is further configured to select a content corresponding to the search word in connection with the first account and generate a file name of the content corresponding to the search word based on the file name generation rule, and the transmitter may be further configured to provide the content list including the file name of the selected content to the client device.

The receiver may be further configured to receive selection information for selecting one file name from the content list from the client device, and the transmitter may be further configured to transmit the content corresponding to the selected file name to the client device.

The controller may be further configured to provide the content to a storage space corresponding to a user account of a person included in the content or to a device of the person included in the content.

The controller may be further configured to store the content in a storage space corresponding to another user account in connection with the user account.

According to another aspect of an exemplary embodiment, there is provided a non-transitory computer readable storage medium storing a program that is executable by a computer to perform the method of managing data.

According to another aspect of an exemplary embodiment, there is provided a method of managing data by a server including: receiving a file associated with a user account from a terminal; analyzing a content and metadata included in the file to determine at least one attribute of the file; and generating a descriptor of the file based on a result of the analyzing and a file name generation rule corresponding to the user account.

The metadata may include at least one piece of information selected from a type of the file, a creation date of the file, a last edit date of the file, a type of device that has created the file, a creation place of the file, and an author of the file, and a size of the file.

The result of the analyzing may include at least one piece of information selected from a name of an object included in the content, an event describing the content, a place in which the event occurs, a type of the file, a creation date of the file, a last edit date of the file, a type of device that has created the file, a creation place of the file, and an author of the file, and a size of the file.

The file name generation rule may indicate a type of information to be included in the descriptor and an order of arranging the information to be included in the descriptor.

BRIEF DESCRIPTION OF THE DRAWINGS

The above and/or other aspects will be more apparent by describing certain exemplary embodiments, with reference to the accompanying drawings, in which:

FIG. 6 is a diagram of an example of storing analysis information about content in a metadata format;

FIG. 11 is a diagram for describing an operation of generating a folder on a content list by a cloud server, according to an exemplary embodiment;

DETAILED DESCRIPTION

Figure 1:
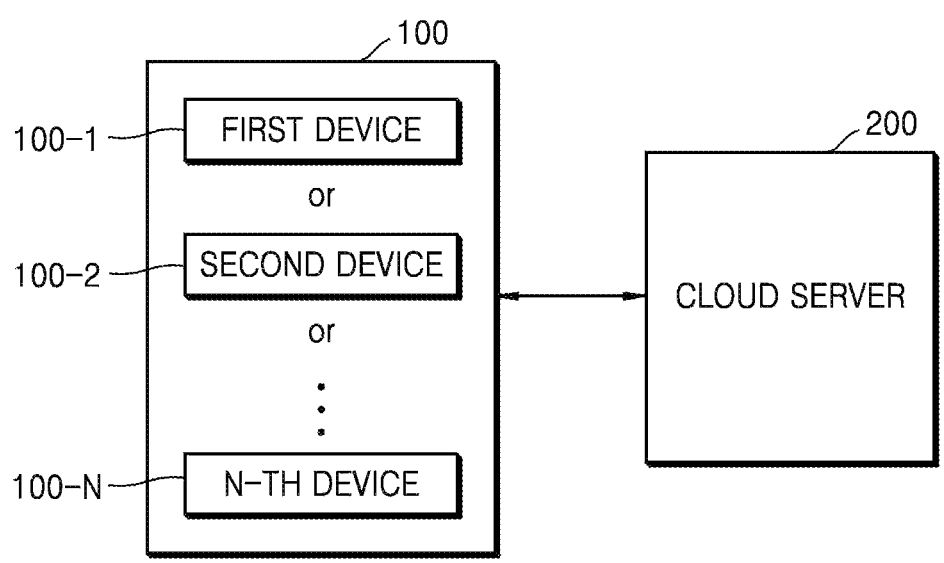
FIG. 1 is a block diagram for describing a content management system according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

Terms used herein will now be briefly described, and then one or more exemplary embodiments will be described in detail.

All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Also, some terms may be arbitrarily selected by the applicant, and in this case, the meaning of the selected terms will be described in detail in the detailed description of the invention. Thus, the terms used herein have to be defined based on the meaning of the terms together with the description throughout the specification.

Also, when a part "includes" or "comprises" an element, unless there is a particular description contrary thereto, the part may further include other elements, not excluding the other elements. In the following description, terms such as "unit" and "module" indicate a unit for processing at least one function or operation, wherein the unit and the block may be embodied as hardware or software or may be embodied by combining hardware and software.

As used herein, the term "and/or" includes any and all combinations of one or more of the associated listed items. Expressions such as "at least one of," when preceding a list of elements, modify the entire list of elements and do not modify the individual elements of the list.

FIG. 1 is a block diagram of a content management system according to an exemplary embodiment.

Referring to FIG. 1, the content management system according to the present exemplary embodiment may include a device 100 and a cloud server 200. However, not all of the elements shown in FIG. 1 are essential elements. That is, the content management system may include more or less elements than those of FIG. 1.

A user may own a plurality of devices (for example, a first device 100-1, a second device 100-2, . . . , and an N-th device 100-N). The plurality of devices (for example, a first device 100-1, a second device 100-2, . . . , and an N-th device 100-N) owned by the user may be the devices of the same kind or different kinds.

Also, according to an exemplary embodiment, each of the plurality of devices (for example, a first device 100-1, a second device 100-2, . . . , and an N-th device 100-N) of the user may access the cloud server 200 via the same user account. Therefore, the cloud server 200 may determine that the plurality of devices (for example, the first device 100-1, the second device 100-2, . . . , and the N-th device 100-N) are owned by one user by verifying account information transmitted from the plurality of devices (for example, the first device 100-1, the second device 100-2, . . . , and the N-th device 100-N). That is, identification information of each of the plurality of devices (for example, the first device 100-1, the second device 100-2, . . . , and the N-th device 100-N) may be connected to the same user account.

Hereinafter, unless otherwise defined, the device 100 may be one of the plurality of devices (the first device 100-1, the second device 100-2, . . . , and the N-th device 100-N).

In the present embodiment, the device 100 may be embodied in various forms. For example, the device 100 may be, but is not limited to, a desktop computer, a mobile phone, a smartphone, a laptop computer, a tablet personal computer (PC), an electronic book terminal, a digital broadcast terminal, a personal digital assistant (PDA), a portable multimedia player (PMP), a navigation device, an MP3 player, a digital camera, an internet protocol television (IPTV), a digital TV, a consumer electronic (CE) device (for example, a refrigerator or an air conditioner having a display), a health information measuring device (for example, a blood-glucose monitoring device or a blood pressure measuring device), sport equipment (for example, a bicycle, a treadmill, a hula hoop, a dumbbell, a jump rope, or a smith machine), a music instrument (for example, a piano, an organ, an electronic keyboard, a guitar, a violin, a cello), a black box for a vehicle, and a closed-circuit TV (CCTV). In the present specification, the device 100 may be a wearable device worn by the user. For example, the device 100 according to the embodiment may be a watch, glasses, a ring, a bracelet, or a necklace.

In addition, according to an exemplary embodiment, the device 100 may perform wired/wireless communication with the cloud server 200 via a network. The network may be a wired network such as a local area network (LAN), a wide area network (WAN), or a value added network (VAN), or a wireless network such as a mobile radio communication network, a short range communication network, or a satellite communication network.

According to the embodiment, the device 100 may access the cloud server 200 by using account information or identification information of the device 100 (for example, a device identification (ID), a serial number, or a MAC address).

In the present embodiment, the device 100 may acquire content and may transmit the acquired content to the cloud server 200. The content according to the exemplary embodiment may be at least one selected from a still image, a moving image, audio content, and text content, but is not limited thereto. For example, the content may include education content, movie content, broadcast content, game content, advertisement content, photo content, or news content.

Also, the content of the present embodiment may include content related to a lifelog. For example, the content may include a black box image taken by a black box for a vehicle, a CCTV image, images captured by a wearable device, or body measuring content (for example, blood sugar information, blood pressure information, or body fat information determined regularly).

In the present specification, the content may be expressed as 'contents' according to exemplary embodiments.

According to the exemplary embodiment, the device 100 may request the cloud server 200 for a content list stored in the cloud server 200. Here, the device 100 may receive a content list including at least one file name generated by the cloud server 200 by analyzing at least one piece of content.

In the present embodiment, the device 100 may transmit the account information to the cloud server 200 and may receive a content list including a file name of a certain format corresponding to the account information from the cloud server 200.

In the present specification, the content may be managed as a file format. Therefore, in the present specification, 'file name of content' may be a name representing the content. In addition, according to an exemplary embodiment, an extension may be provided to a content file according to the specification of the content. For example, if the content type is a photograph, an extension 'jpg' may be used, if the content type is an audio file, an extension 'ac3' may be used, if the content type is a memo, an extension 'txt' may be used, and if the content type is a video, an extension 'mpeg' or 'avi' may be used. Here, according to the exemplary embodiment, 'file name of the content' may include the extension, but is not limited thereto. That is, according to the examples, the file name of the content may not include the extension. For the convenience of description, it will be assumed that the file name includes the extension.

The cloud server 200 may be a virtual server based on cloud computing. According to the present embodiment, the device 100 may store or manage the content by using the cloud computing-based virtual server.

The cloud server 200 may include an intelligence engine, and may analyze event information or information about the content collected by the device 100 via the intelligence engine. For example, the cloud server 200 may infer a status of the user or an environment where the device 100 is by analyzing the event information collected by the device 100. Also, the cloud server 200 may draw a core keyword through image processing, video processing, or audio processing performed on the content, extract an object included in the content, or analyze metadata of the content.

According to the exemplary embodiment, the cloud server 200 generates a file name for each piece of content by using the analysis information of the content, and may provide a content list including the generated file name to the device 100. According to the present embodiment, the cloud server 200 may update the file name of the content according to a user request.

According to the present embodiment, the cloud server 200 may store the contents in a plurality of storage spaces. For example, if a first user and a second user verify each other to share the storage space, the cloud server 200 may store the content transmitted from a device of the first user in a storage space of the second user.

Also, the cloud server 200 may delete content corresponding to a predetermined condition or recommend moving the content to the storage space of the device 100. For example, the cloud server 200 may ensure the storage space by deleting content that was generated long ago, was viewed less frequently, or stored two. According to the exemplary embodiment, the cloud server 200 may store the content transmitted from the device 100 in a compressed file format.

Hereinafter, an example of generating a file name of the content in the cloud server 200 by using analysis information about the content will be described in detail with reference to FIG. 2.

Figure 2:
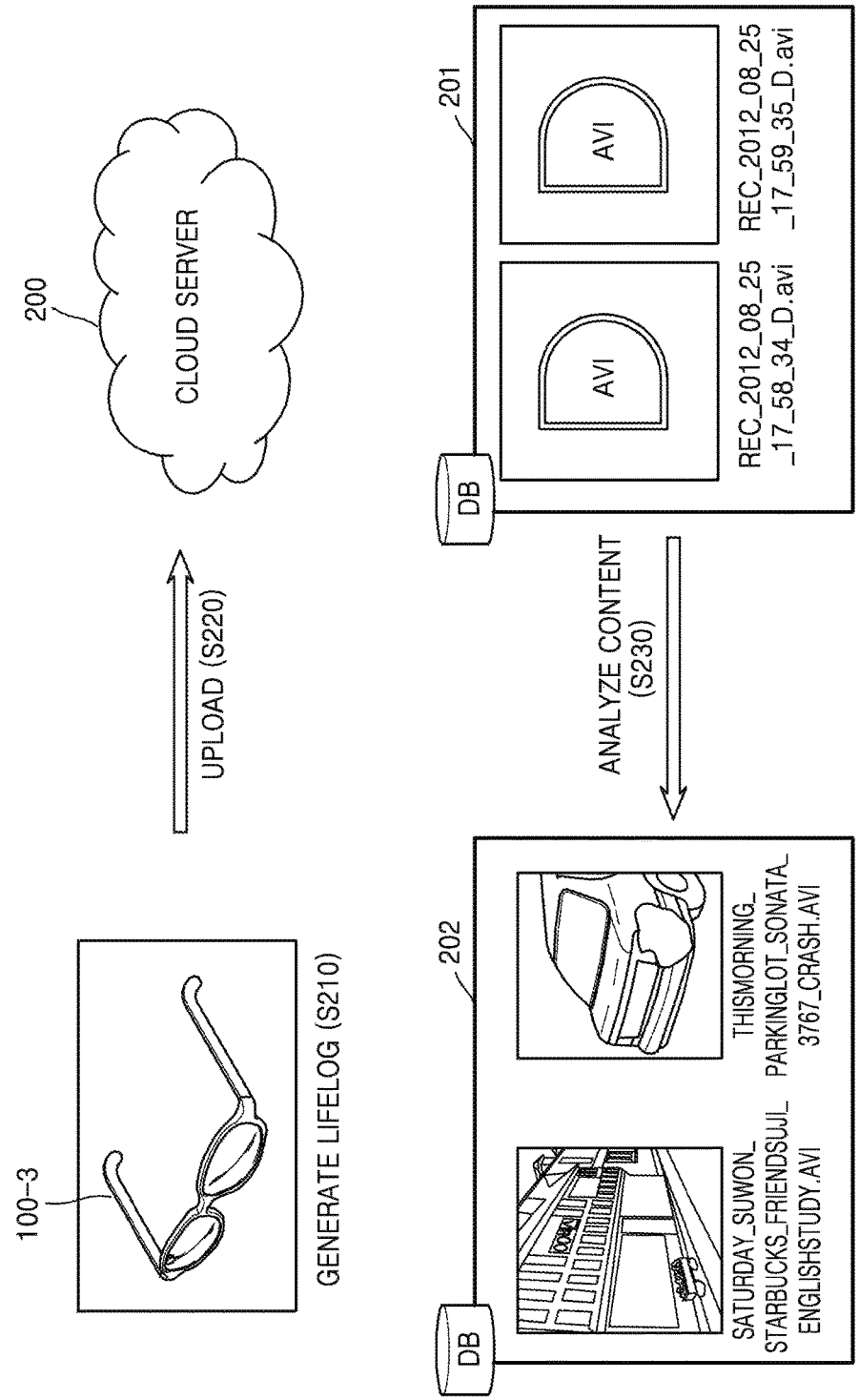
FIG. 2 is a diagram for describing an example of the content management system.

FIG. 2 is a diagram for describing a content management system.

As shown in FIG. 2, in operation S210, a head mounted display (HMD) 100-3 (for example, glasses) may generate a lifelog. For example, the HMD 100-3 may capture a certain scene, may record a certain environment, or may record certain sound.

In operation S220, the HMD 100-3 may upload the lifelog to the cloud server 200. The HMD 100-3 may upload the lifelog to the cloud server 200 with a predetermined period, or may upload the lifelog to the cloud server 200 whenever the lifelog is generated. For example, the HMD 100-3 may capture a still or moving image of a certain scene or record an audio stream, and transmit the captured image or recorded audio stream to the cloud server 200.

The cloud server 200 may store the content related to the lifelog transmitted from the HMD 100-3. Here, the cloud server 200 may generate a file name including, for example, a date, a day, and a serial number for managing the content related to the lifelog. For example, the cloud server 200 may generate a file name of a first video content transmitted from the HMD 100-3 as 'REC_2012_08_25_17_58_34_D.avi', and may generate a file name of a second video content transmitted from the HMD 100-3 as 'REC_2012_08_25_17_59_35_D.avi'.

In addition, if the HMD 100-3 transmits a request for a content list, the cloud server 200 may provide the HMD 100-3 with a content list 201 including the file name 'REC_2012_08_25_17_58_34_D.avi' of the first video content and the file name 'REC_2012_08_25_17_59_35_D.avi' of the second video content. Here, a user of the HMD 100-3 may not easily understand properties or attributes of the first and second video contents relying on their file names 'REC_2012_08_25_17_58_34_D.avi' and 'REC_2012_08_25_17_59_35_D.avi'.

Therefore, according to the present embodiment, in operation S230, the cloud server 200 may obtain analysis information about the content by analyzing the content related to the lifelog transmitted from the HMD 100-3. In addition, the cloud server 200 may generate a file name of the content by using the analysis information about the content.

For example, the cloud server 200 may analyze the first video content transmitted from the HMD 100-3, and then, may generate the file name of the first video content as 'Saturday_Suwon_Starbucks_friendSuji_EnglishStudy.avi' and may generate the file name of the second video content as 'ThisMorning_ParkingLot_Sonata_3767_crash.avi'.

In addition, if the HMD 100-3 requests the cloud server 200 for a content list, the cloud server 200 may provide the HMD 100-3 with a content list 202 including the file name of the first video content ('Saturday_Suwon_Starbucks_friendSuji_EnglishStudy.avi') and the file name of the second video content ('ThisMorning_ParkingLot_Sonata_3767_crash.avi').

Here, the user of the HMD 100-3 may intuitively recognize the video content from the file name of the first video content ('Saturday_Suwon_Starbucks_friendSuji_EnglishStudy.avi') and the file name of the second video content ('ThisMorning_ParkingLot_Sonata_3767_crash.avi') included in the content list 202.

In addition, the cloud server 200 may generate the file name of the content in various formats by using the analysis information about the content. For example, according to the exemplary embodiment, the cloud server 200 may generate file names to be different according to users (e.g., generate the file name by taking into account the preference of the users) or to be different according to devices (e.g., adjust a length of the file name according to a screen size). A method of providing different types of file names according to users by the cloud server 200 will be described later with reference to FIG. 7. The present embodiment is not limited thereto, and the content analysis and the file name generation (operation S230) may be performed by the HMD 100-3. Hereinafter, a method of acquiring the analysis information about the content in the cloud server 200 will be described below.

Figure 3:
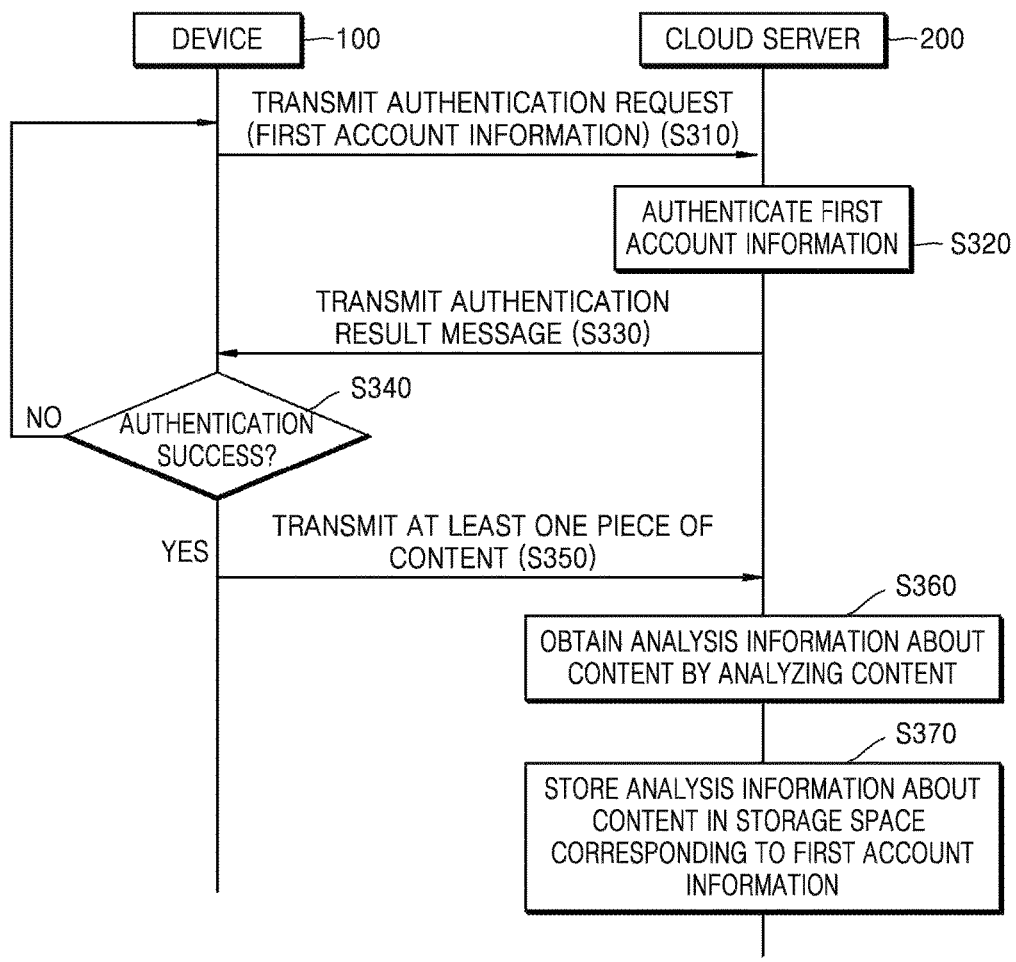
FIG. 3 is a flowchart of a method of obtaining analysis information about content in a cloud server, according to an exemplary embodiment.

FIG. 3 is a flowchart illustrating a method of obtaining analysis information about content in the cloud server 200, according to the exemplary embodiment.

In operation S310, the device 100 may request the cloud server 200 for authentication of first account information when transmitting the first account information to the cloud server 200. The first account information may be identification information of the user registered in the cloud server 200 in advance by the user of the device 100 in order to access the cloud server 200. For example, the first account information may include a first user identification (ID) and a first password. Also, according to the exemplary embodiment, the first account information may include identification information of the device 100 (e.g., a device ID and MAC address).

In operation S320, the cloud server 200 may perform authentication of the first account information in response to the authentication request of the device 100. For example, the cloud server 200 may compare the first account information transmitted from the device 100 with pre-registered account information to perform the authentication of the first account information.

In operation S330, the cloud server 200 may transmit an authentication result message of the first account information to the device 100. For example, if the authentication of the first account information has succeeded, the cloud server 200 may transmit an authentication success message to the device 100. Otherwise, if the authentication of the first account information has failed, the cloud server 200 may transmit an authentication failure message to the device 100.

In operation S340, the device 100 may identify whether the authentication of the first account information has succeeded based on the authentication result message. If the authentication of the first account information has failed, the device 100 may transmit the first account information to the cloud server 200 again.

In operation S350, if the authentication of the first account information has succeeded, the device 100 may transmit at least one piece of content to the cloud server 200. For example, if logging-in has succeeded based on the first account information, the device 100 may request the cloud server 200 to store the at least one piece of content while transmitting the at least one piece of content acquired by the device 100 to the cloud server 200. In this case, according to the present embodiment, the device 100 may delete the content from an internal memory.

In operation S360, the cloud server 200 may analyze the content transmitted from the device 100 to acquire analysis information about the content.

According to the exemplary embodiment, the analysis information may include at least one selected from attribute information extracted from the at least one piece of content, information about the device collecting the at least one piece of content, information about the environment when the at least one piece of content is collected, and user information corresponding to the first account information.

According to the exemplary embodiment, the cloud server 200 may perform image processing on the content transmitted from the device 100. In addition, the cloud server 200 may identify an object included in the content through the image processing performed on the content.

For example, the cloud server 200 may extract a person from photo content and may compare the extracted person with a personal information database (e.g., a phonebook and a social networking service (SNS) information database) to identify who is included in the content. Also, the cloud server 200 defines a template based on object information (e.g., car models, animals, plants, furniture, etc.) in advance and compares the pre-defined template with the photo content to identify the object included in the content.

Here, the cloud server 200 may deduce a keyword related to the object included in the content by using ontology. Ontology denotes formal and explicit specification about shared conceptualization. Ontology may be considered as a kind of dictionary consisting of words and relationships, and words related to a certain domain are expressed hierarchically and inference rules for additionally expanding the words are included in the ontology.

According to the present embodiment, the cloud server 200 may perform audio processing on the content transmitted from the device 100. For example, if the cloud server 200 receives music content or voice content, the cloud server 200 may deduce a keyword from the audio content such as the music content or the voice content by using a voice recognition algorithm.

Also, the cloud server 200 may identify who makes the sound by comparing the audio content with a sound database defined in advance. For example, if the cloud server 200 receives content in which bird sound is recorded, the cloud server 200 may compare the content with the sound database to detect the keyword 'bird sound'.

According to the present embodiment, the cloud server 200 may perform video processing on video content so as to deduce a keyword related to the object included in the video content. For example, the cloud server 200 extracts keywords through the image processing with respect to each frame in the video content and selects a keyword of interest based on extraction frequency among the extracted keywords. Also, the cloud server 200 may perform audio processing on sound included in the video content to extract the keyword.

The device 100 may acquire meaningful units (for example, keywords) related to the content from metadata inserted in the content in advance by using the ontology. The metadata inserted in the content in advance may include a resolution of the content, the name of the content, the kind of the content, the synopsis of the content, and representative object information included in the content. Also, the metadata inserted in the content in advance may include information about a space where the content is collected, a time when the content is collected, a content generator, and a device collecting the content. In addition, the meaningful unit may denote a minimal meaningful unit of language; for example, the meaningful unit may be a morpheme in Korean or a word in English.

The operation of acquiring keywords may be performed by the cloud server 200. For example, if the name of the content is "Exploration of animal world for kids", the cloud server 200 may acquire the meaningful units related to the content, such as kids, toddler, child, children, animal, beast, lion, elephant, tiger, giraffe, leopard, world, exploration, and travel.

In addition, the cloud server 200 may combine the keywords that are extracted through the image processing, the audio processing, or the video processing with respect to the content to deduce event information.

According to the exemplary embodiment, the cloud server 200 may acquire additional information related to the content, in addition to the information obtained by analyzing the content, as the analysis information about the content. For example, the cloud server 200 may acquire information about the device 100 collecting the content (e.g., the kind of the device 100, network information, and operating mode information of the device 100), environmental information when collecting the content (e.g., temperature, humidity, luminance, weather, atmospheric contamination level, and noise), and user information corresponding to the first account information (e.g., schedule information of the user, friend information of the user, SNS usage log information, and motion status information of the user) as the analysis information.

In addition, the cloud server 200 may use information determined by other devices than the device 100 that transmits the content, as the analysis information about the content. For example, if the user takes a picture of an external view of a car, the cloud server 200 receives velocity information from the car, and may use the velocity information of the car as the analysis information about the photo content captured by a camera.

In operation S370, the cloud server 200 may store analysis information about the content and the content in the storage space corresponding to the first account information. Here, the cloud server 200 may store the analysis information about the content in a metadata format of the content. An example of storing the analysis information in the metadata format will be described in detail with reference to FIG. 6.

In addition, the cloud server 200 may store the content after classifying the content according to devices, content types, or objects included in the content, but is not limited thereto.

Figure 4:
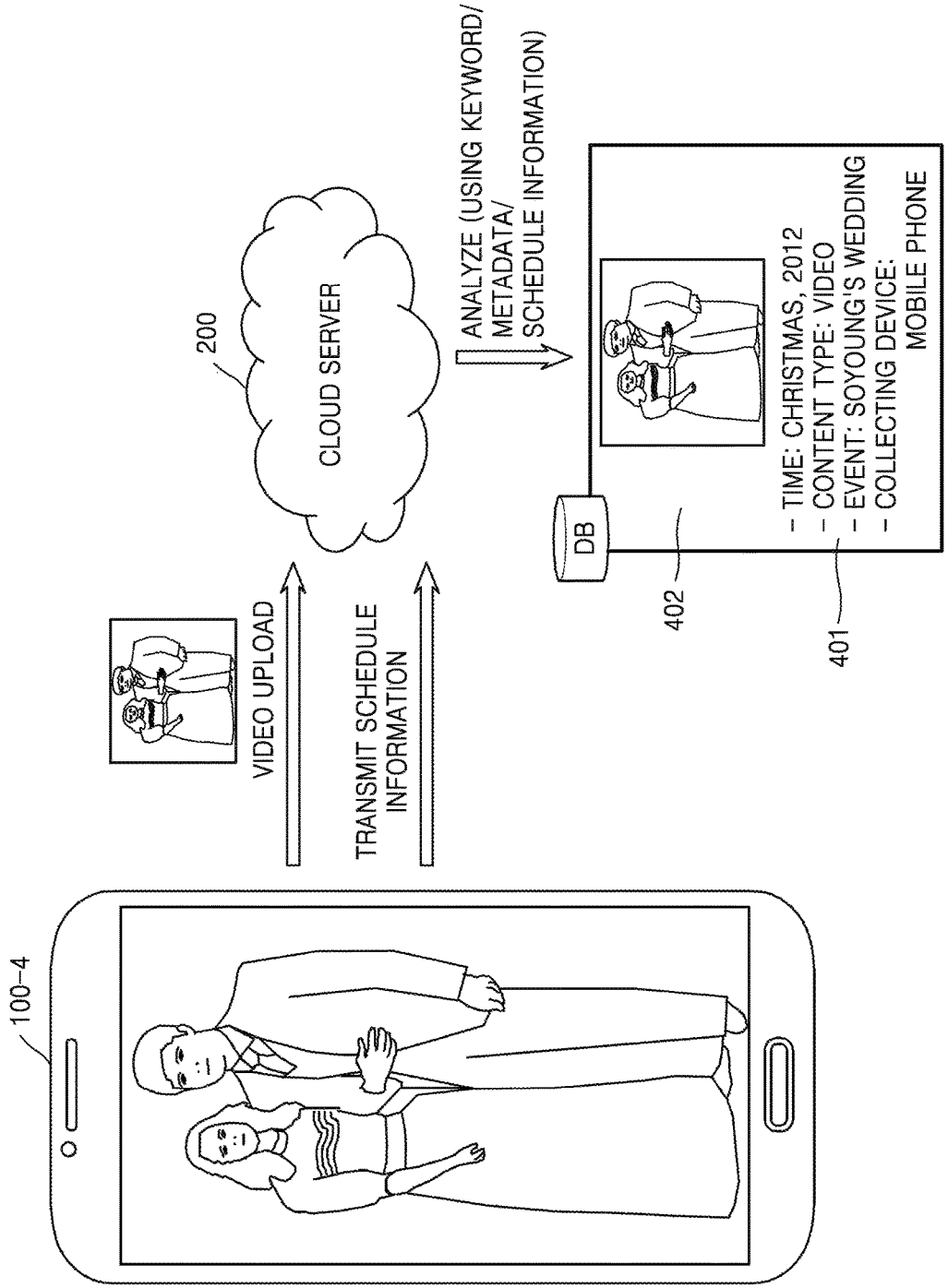
FIG. 4 is a diagram of an example of obtaining analysis information about video content in a cloud server.

FIG. 4 is a diagram showing an example of obtaining analysis information about video content in the cloud server 200. In FIG. 4, it will be assumed that the device 100 is a mobile phone 100-4.

The user may take a moving picture at a friend's wedding ceremony. Here, the mobile phone 100-4 may upload the wedding ceremony video to the cloud server 200 communicating with the mobile phone 100-4. Here, the mobile phone 100-4 may be logged in the cloud server 200 by using the first account information.

According to the exemplary embodiment, the mobile phone 100-4 may upload the wedding ceremony video to the cloud server 200 when the mobile phone 100-4 receives a certain input (for example, an upload input) of the user. Otherwise, the mobile phone 100-4 may automatically upload the wedding ceremony video to the cloud server 200 when the shooting of the video is finished, or at a predetermined interval.

According to the exemplary embodiment, the mobile phone 100-4 may transmit user information such as schedule information input in a schedule management application by the user to the cloud server 200.

When the cloud server 200 receives the video content from the mobile phone 100-4, the cloud server 200 may analyze the video content. For example, the cloud server 200 may extract keywords such as 'wedding ceremony' and 'nuptial song' through a video processing operation on the video content. In addition, the cloud server 200 may compare objects included in the video content with the personal information database, and may identify that the persons included in the video content are 'friend 1' and 'friend 2'.

The cloud server 200 may acquire time information and spatial information of photographing the video from the metadata included in the video content. For example, the cloud server 200 may extract keywords such as 'Dec. 25, 2012', 'Christmas' and 'Gangnam station, Seoul' related to the video content by using the metadata inserted in the video content.

The cloud server 200 may determine that the kind of the content transmitted from the mobile phone 100-4 is video by identifying an extension of the content file (for example, 'avi').

In addition, if the schedule information of the user includes 'Dec. 25, 2012: Soyoung's Wedding', the cloud server 200 may select an event related to the video content transmitted from the mobile phone 100-4 as 'Soyoung's Wedding' by taking into account the schedule information of the user.

According to the exemplary embodiment, the cloud server 200 may store analysis information 401 after mapping the analysis information 401 about the content to the first account information in a metadata format (e.g., time: Christmas, 2012, Content type: video, Event: Soyoung's wedding, Collecting device: mobile phone).

Here, the cloud server 200 generates a thumbnail image 402 related to the video content and may store the thumbnail image 204 with the analysis information 401 in the cloud server 200. The thumbnail image 402 may be a first frame image of the video content or a representative frame image, but is not limited thereto.

Figure 5:
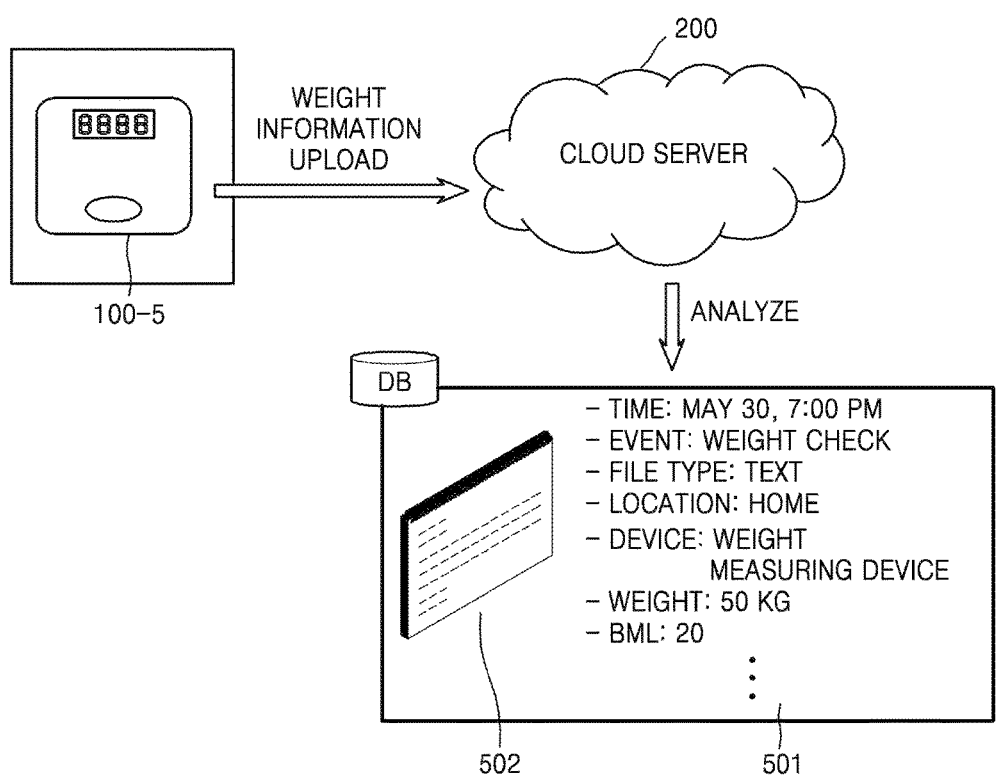
FIG. 5 is a diagram of an example of obtaining analysis information about weight information content in a cloud server.

FIG. 5 is a diagram of an example of obtaining analysis information about weight information content in the cloud server 200. In FIG. 5, it is assumed that the device 100 is a scale 100-5.

The user may measure his/her weight every night by using the scale 100-5. For example, the user may measure his or her weight, body fat, degree of obesity, and basal metabolic rate (BMR) by using the scale 100-5. Here, the scale 100-5 may transmit the measured weight information (e.g., weight, body fat, degree of obesity, and BMR) to the cloud server 200 communicating with the scale 100-5. Here, the scale 100-5 may be logged in the cloud server 200 by using the first account information.

If text content including the weight information is transmitted from the scale 100-5, the cloud server 200 analyzes the text content to extract keywords such as 'Weight: 50 kg, BMR: 20, Event: weight check'. Also, the cloud server 200 may determine that the content type transmitted from the scale 100-5 is 'text' by identifying an extension of the content file (for example, 'txt').

The cloud server 200 may identify the time of measuring the weight information (e.g., 7 PM, May 30), location (e.g., house), and the device (e.g., the scale 100-5) from metadata that is transmitted with the text content.

According to the exemplary embodiment, the cloud server 200 may store analysis information 501 about the text content by mapping the analysis information 501 to the first account information in the metadata format (e.g., Time: 7 PM, May 30, Event: weight check, File type: text, location: home, Device: scale, Weight: 50 kg, BMR: 20).

Here, the cloud server 200 may generate a thumbnail image 502 related to the text content and may store the thumbnail image 502 with the analysis information 501. The thumbnail image 502 may be an icon indicating the content type (e.g., an icon indicating the text content), but is not limited thereto.

FIG. 6 is a diagram showing an example of storing analysis information about the content in a metadata format.

As shown in FIG. 6, according to the exemplary embodiment, the cloud server 200 may build a content database with respect to each account, by using the analysis information about at least one piece of content transmitted from the device 100. For example, the cloud server 200 may manage the analysis information about the at least one piece of content which is transmitted from the device 100 in a format of the metadata about the at least one piece of content. Here, the analysis information about the at least one piece of content may include content attribute information 610 and context information 620.

The content attribute information 610 may be keyword information about the content extracted through the image processing, the video processing, or the audio processing with respect to the content. For example, the content attribute information 610 may include objects included in the content (e.g., human beings or objects), content type (e.g., photographs, video, movies, and web pages), content generation time, places related to the content, the event, and content running time (e.g., 5 minutes), but is not limited thereto.

The context information 620 is information about the status of the device 100, the surrounding status of the device 100, and the user status when the content is acquired. The context information 620 may include information such as the weather, temperature, collecting device, location of the device, collecting method (e.g., user input or monitoring), and schedule of the user, but is not limited thereto.

For example, if the user goes to the beach to celebrate his or her birthday party and takes a picture by using a mobile phone, the mobile phone may upload the picture to the cloud server 200.

When the cloud server 200 receives the picture taken by the mobile phone as a first content, the cloud server 200 may store attribute information about the 'first content' (e.g., 'objects: user 1, user 2, dog, cake, Content type: photograph image, Time: 15:13, May 3, 2012, Place: seashore, Event: birthday party), and context information (e.g., 'Weather: cloudy, Temperature: 20° C., Collecting device: mobile phone, Location of the device: Seaside villa, Collecting method: user input, User schedule: My birthday party') as the analysis information about the first content.

According to the exemplary embodiment, the cloud server 200 may generate a file name of at least one piece of content by using the analysis information about at least one piece of content included in a content database. Here, the cloud server 200 may generate the file name to be different according to the account information of the user. This will be described below with reference to FIG. 7.

Figure 7:
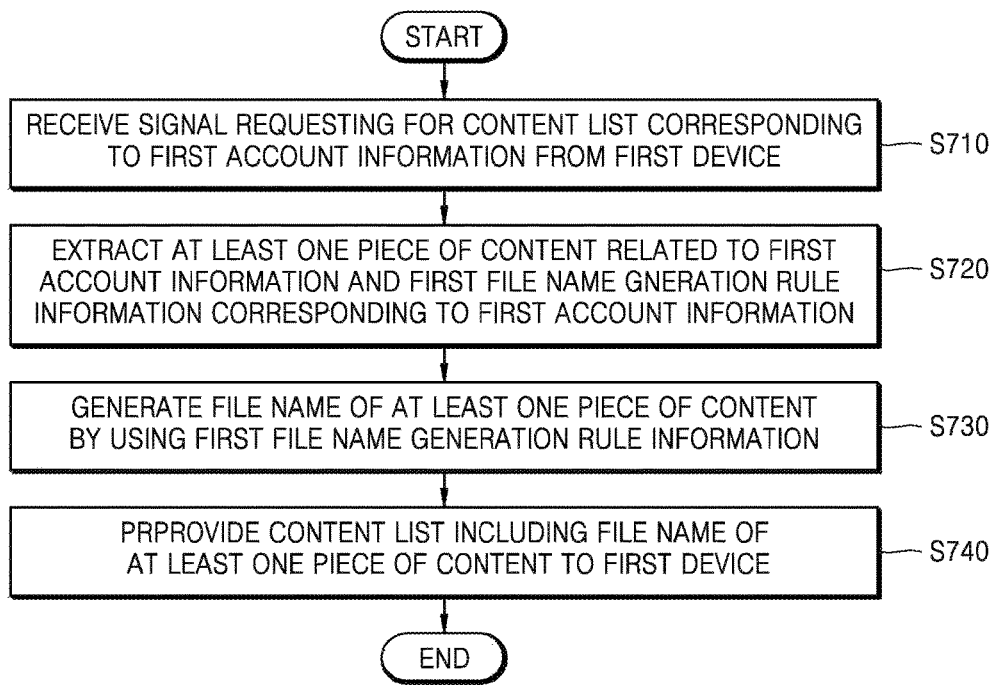
FIG. 7 is a flowchart of a method of managing content, according to an exemplary embodiment.

FIG. 7 is a flowchart of a content management method according to an exemplary embodiment.

In operation S710, the cloud server 200 may receive a signal for requesting a content list corresponding to the first account information from the first device 100-1.

The first account information may include a user ID and a password. The first account information may also include identification information of the first device 100-1 (e.g., the device ID, MAC address, and device name), but is not limited thereto.

According to the exemplary embodiment, the first device 100-1 may be logged in the cloud server 200 by using the first account information.

In operation S720, the cloud server 200 may extract or select at least one piece of content related to the first account information and first file name generation rule information corresponding to the first account information. For example, the cloud server 200 may extract or select at least one piece of content collected by at least one device (e.g., the first device 100-1, the second device 100-2, . . . , or the N-th device 100-N) logged in the cloud server 200 by using the first account information.

Also, the cloud server 200 may extract the first file name generation rule information transmitted from the at least one device linked with the first account information. For example, the first file name generation rule information transmitted from the at least one device (e.g., the first device 100-1, the second device 100-2, . . . , or the N-th device 100-N) logged in the cloud server 200 by using the first account information may be extracted or selected. Here, the first file name generation rule information may be mapped to or associated with the first account information.

In the present specification, 'file name generation rule information' denotes information about a rule for generating the file name of the content. For example, according to the exemplary embodiment, the first file name generation rule information may include at least one selected from file name length information, information about items included in the file name, and information about the order of the items included in the file name, but is not limited thereto. The file name generation rule information will be described in more detail later with reference to FIG. 8.

In operation S730, the cloud server 200 may generate a file name about the at least one piece of content by using the first file name generation rule information. For example, the cloud server 200 may generate the file name of the at least one piece of content (e.g., object name_time_place_event.extension) in an order of the object name, the time, the place, and the event according to the first file name generation rule information.

Here, the first file name generation rule information may be set by a first user using the first account information. Therefore, the cloud server 200 may generate the file name to be suitable for the preference of the first user using the first account information. In this case, the first user may easily identify or search for the content by using the file name. If the first user does not set or customize the first file name generation rule information, a default file name generation rule, which is set by the cloud server 200, is applied to the first user.

According to the exemplary embodiment, the cloud server 200 may generate a file name of at least one piece of content by using the analysis information about the at least one piece of content stored in advance and the first file name generation rule information. For example, the cloud server 200 may extract the items included in the first file name generation rule information (for example, the object, the time, the place, and the event) from the attribute information extracted from the content, the information about the device collecting the content, the circumferential information when collecting the content, and the user information corresponding to the first account information. In addition, the cloud server 200 may generate the file name of the content (e.g., object name_time_place_event.extension) by using the extracted items.

The operations of receiving the at least one piece of content from the at least one piece of content linked with the first account information, analyzing the at least one piece of content, and storing the analysis information about the at least one piece of content by the cloud server 200 are described above with reference to FIG. 3, and thus, descriptions thereof are omitted.

In addition, according to the exemplary embodiment, the cloud server 200 may generate the file name of the at least one piece of content by using the information collected from the plurality of devices linked with the first account information and the first file name generation rule information.

For example, the cloud server 200 may generate the file name of the content by using at least one selected from velocity information collected by the second device 100-2, luminance information, sound information, health information of the user, schedule information of the user, and SNS information of the user, in addition to the attribute information of the content collected by the first device 100-1.

According to the exemplary embodiment, the at least one device linked with the first account information may include at least one selected from a mobile terminal, a black box, a wearable device, a CCTV, and a health information measuring device, but is not limited thereto. The operation of generating the file name by using the information collected from the plurality of devices in the cloud server 200 will be described in detail later with reference to FIG. 15.

In operation S740, the cloud server 200 may provide a content list including the file name of the at least one piece of content to the first device 100-1.

For example, the cloud server 200 may provide the content list including the file names generated based on the first file name generation rule information corresponding to the first account information to the first device 100-1. In this case, the first user of the first device 100-1 may easily identify the content based on the file names included in the content list.

In addition, the cloud server 200 may acquire a thumbnail image corresponding to the at least one piece of content. Then, the cloud server 200 may provide the content list further including the thumbnail image corresponding to the at least one piece of content to the first device 100-1. According to the exemplary embodiment, the thumbnail image may be at least one selected from a first frame image of video content, a representative frame image of the video content, a frame image showing the most items included in the file name, and an icon representing the content type, but is not limited thereto.

According to the exemplary embodiment, the cloud server 200 may automatically group the at least one piece of content. The cloud server 200 may provide a list of grouped content to the first device 100-1.

For example, the cloud server 200 may classify the at least one piece of content as at least one group according to a criterion set in advance. The criterion set in advance may be at least one selected from a kind of the device, a kind of the object, a kind of the event, time, and place, but is not limited thereto. For example, the cloud server 200 may group the at least one piece of content according to the kind of the device, the kind of the object, and the kind of the event. Here, according to the present embodiment, the cloud server 200 may generate a folder corresponding to at least one group in the content list.

Figure 8:
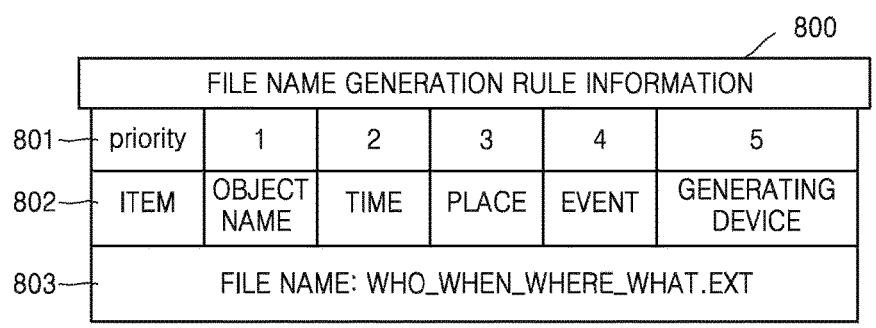
FIG. 8 is a diagram for describing information about a file name generation rule, according to an exemplary embodiment.

FIG. 8 is a diagram for describing file name generation rule information 800 according to the exemplary embodiment.

As shown in FIG. 8, the file name generation rule information 800 according to the present embodiment may include information about items included in a file name 802, and information about an order of the items included in the file name 801.

For example, the file name generation rule information 800 may include such rules that the items like the object information, the time information, the place information, the event information, and the generating device information are required when generating the file name, and that the items are arranged in an order of the object name, the time information, the place information, and the event information. The item corresponding to the generating device information may indicate a type of the generating device or a format of a file created by the generating device.

In this case, according to the file name generation rule information 800, a file name of a format 'who_when_where_ what.extension' 803.

In addition, the file name generation rule information 800 may include information about 'language hierarchy'. In the present specification, 'information about the language hierarchy' may denote information about the generalization level for generalizing the items included in the file name and representing the items as natural language. Here, the language hierarchy may be classified variously as a hypernym level and a hyponym level based on WordNet (hierarchical word reference system). For example, the language level may be classified as a plurality of levels (e.g., a first level to a tenth level), but is not limited thereto.

According to the exemplary embodiment, the time information may be expressed variously as, for example, year, quarter of a year, month, week, day, AM/PM, time, minute, and second units, and thus, the file name generation rule information 800 may include language hierarchy information for representing the time information. If the language level for the time information is selected as 'four seasons' and the time of collecting the content is '10:26:10, Aug. 8, 2013', the time information in the file name may be expressed as 'summer'.

According to the exemplary embodiment, the place information may be expressed as a global positioning system (GPS) coordinate value (e.g., latitude: 37.4872222, longitude: 127.0530792), and the GPS coordinate value may be generalized as upper level information and expressed as area name, city name, and country name. Thus, the file name generation rule information 800 may include language hierarchy information for representing the place information.

For example, if the language level for representing the place is selected as 'city name' and the coordinate of the place where the content is collected is 'latitude: 37.29111 and longitude: 127.00889', the place information may be expressed as 'Suwon city' in the file name.

Figure 9:
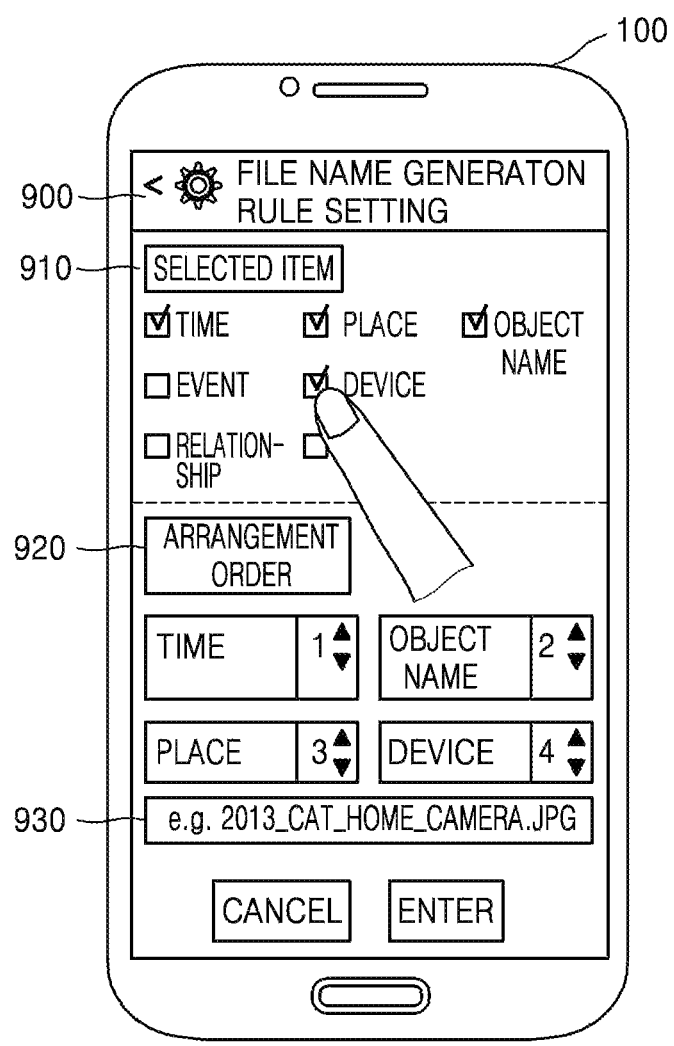
FIG. 9 is a diagram of a graphical user interface (GUI) for setting the file name generation rule, according to an exemplary embodiment.

FIG. 9 is a diagram of a graphical user interface (GUI) 900 for setting the file name generation rule, according to the exemplary embodiment.

As shown in FIG. 9, according to the exemplary embodiment, the device 900 may provide the GUI 900 for setting the file name generation rule. Here, the GUI 900 includes at least one selected from a field 910 for selecting items to be included in the file name, a field 920 for determining an order of arranging the items included in the file name, and a field 930 for representing an example of the file name, but is not limited thereto.

For example, the user of the device 100 may select the time, the place, the object name, and the device on the field 910 for selecting the items to be included in the file name. In addition, the user of the device 100 may set the order of arranging the items so that the time is arranged first, the object name is arranged second, the place is arranged third, and the device is arranged fourth, on the field 920 to determine the order of arranging the items included in the file name.

In this case, the device 100 may display an example of the file name such as 'e.g. 2013_cat_house_camera.JPG' that corresponds to the file name generation rule set by the user, on the field 930 representing the example of the file name.

According to the exemplary embodiment, the GUI 900 may further include a field for setting the language level. In this case, the user of the device 100 may set the language level with respect to the items included in the file name via the GUI 900. For example, the user may set the time information' to be expressed as year or holiday (e.g., Christmas or 2013), set the 'place information' to be expressed as tourist site or city name (e.g., New York, Nami island, or the Louvre Museum), set the 'personal information' to be expressed as the relationship with the user (e.g., father, mother, friend, teacher, or co-worker), and set the 'device information' to be expressed as the kind of the device (e.g., camera, mobile phone, tablet, glasses, or black box).

According to another exemplary embodiment, the selected items, "time" in the first place, "object name" in the second place, "place" in the third place, and "device" in the fourth place, which are displayed under the arrangement order field 920 may be selected through a dropdown menu function that shows a list of choices (e.g., time, place, object name, event, device, and relationship) when a user activates the dropdown menu function. For example, when the user clicks on a box designated as a number "1" as shown in FIG. 9, the dropdown menu function is activated and a list of "time, place, object name, event, device, and relationship" appears so that the user may select "time" among the list.

Figure 10:
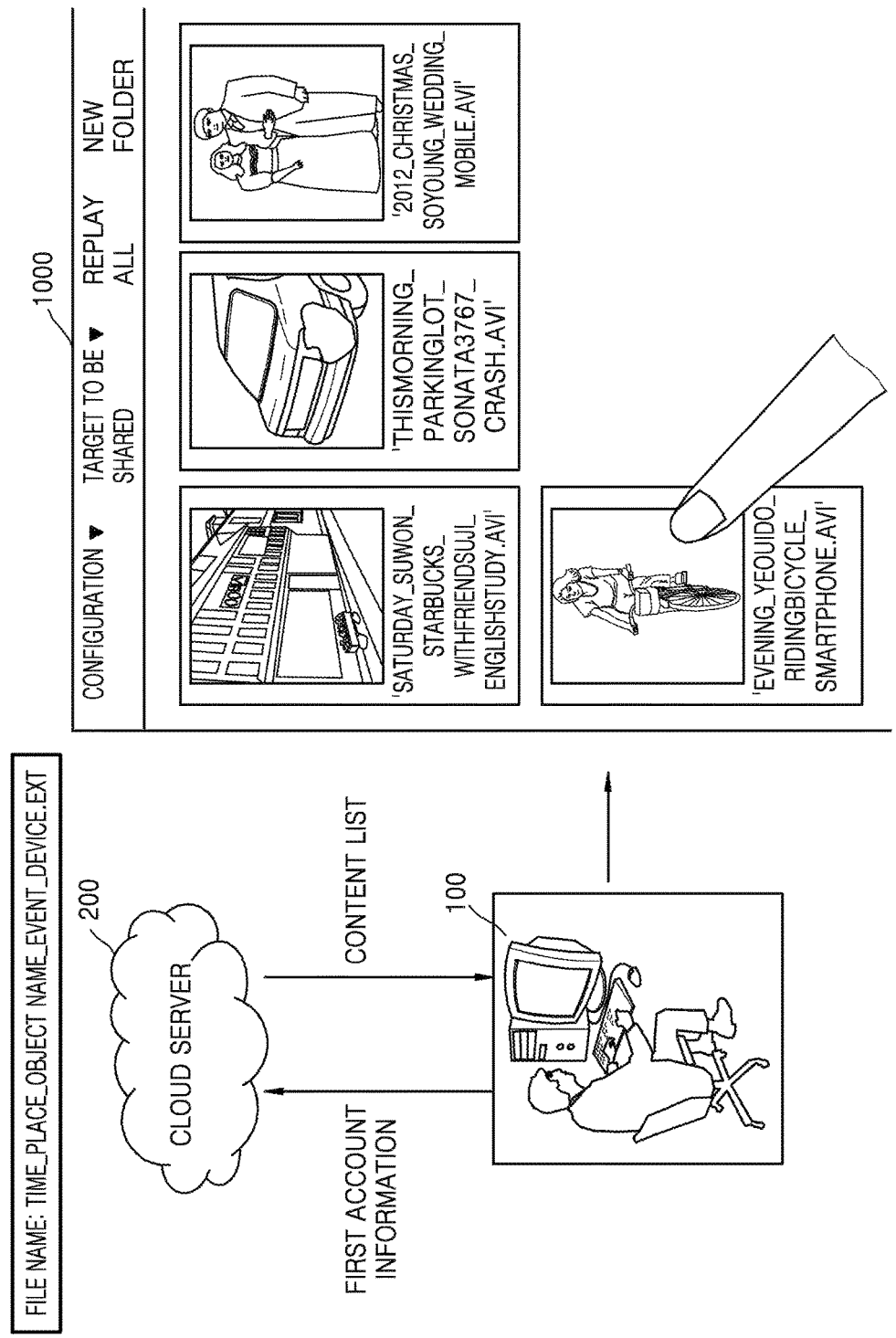
FIG. 10 is a diagram for describing an operation of providing a content list corresponding to first account information in a cloud server, according to an exemplary embodiment.

FIG. 10 is a diagram for describing an operation of providing a content list corresponding to the first account information by the cloud server 200, according to the exemplary embodiment.

As shown in FIG. 10, the device 100 may request the cloud server 200 for a content list 1000 corresponding to the first account information, while transmitting the first account information to the cloud server 200.

In response to the request, the cloud server 200 may extract the contents corresponding to the first account information and the first file name generation rule information corresponding to the first account information. If the first file name generation rule information includes generation of the file name in a format of 'time_place_object name_event_device.extension', the cloud server 200 may generate the file names of the contents (e.g., first content to fourth content) corresponding to the first account information in the format of 'time_place_object name_event_device.extension'.

For example, the cloud server 200 generates the file name 'Saturday_Suwon_Starbucks_withFriendSuji_EnglishStudy.avi' of the first content, generates the file name 'ThisMorning_ParkingLot_Sonata3767_Crash.avi' of the second content, generates the file name '2012_Christmas_Soyoung_Wedding_Mobile.avi' of the third content, and generates the file name 'Evening_Yeouido_RidingBicycle_Smartphone.avi' of the fourth content, by using the analysis information about the contents stored in advance.

The cloud server 200 may transmit the content list 1000 including the file names of the first to fourth content to the device 100. Here, the cloud server 200 may provide the content list 1000 further including the thumbnail images corresponding to the first to fourth content to the device 100.

FIG. 11 is a diagram for describing an operation of generating a folder on the content list by the cloud server 200, according to the exemplary embodiment.

As shown in FIG. 11, the device 100 may request the cloud server 200 for a content list 1100 corresponding to the first account information while transmitting the first account information to the cloud server 200.

In response to the request, the cloud server 200 may extract the contents corresponding to the first account information and the first file name generation rule information corresponding to the first account information. In addition, the cloud server 200 may generate the file names of the contents corresponding to the first account information, based on the first file name generation rule information.

Here, according to the exemplary embodiment, the cloud server 200 may classify the contents corresponding to the first account information into a plurality of groups based on a predetermined criterion.

For example, the cloud server 200 may classify the contents into a plurality of groups based on an event 1101 (e.g., wedding ceremony, workshop, or family trip), and may generate a first folder (Mar. 5, 2013, Wedding ceremony), a second folder (May 2013, workshop), and a third folder (January 2014, Family trip) in the content list 1100.

The cloud server 200 may classify the contents into a plurality of groups based on a device 1102 transmitting the content, and may generate a fourth folder (camera), a fifth folder (black box), a sixth folder (HMD), and a seventh folder (blood-glucose measuring device) in the content list 1100.

According to the present embodiment, the cloud server 200 may transmit the content list 1100 including a plurality of folders to the device 100. In this case, since the contents are grouped by a predetermined criterion in the content list 1100, the user of the device 100 may rapidly search for certain content.

Figure 12:
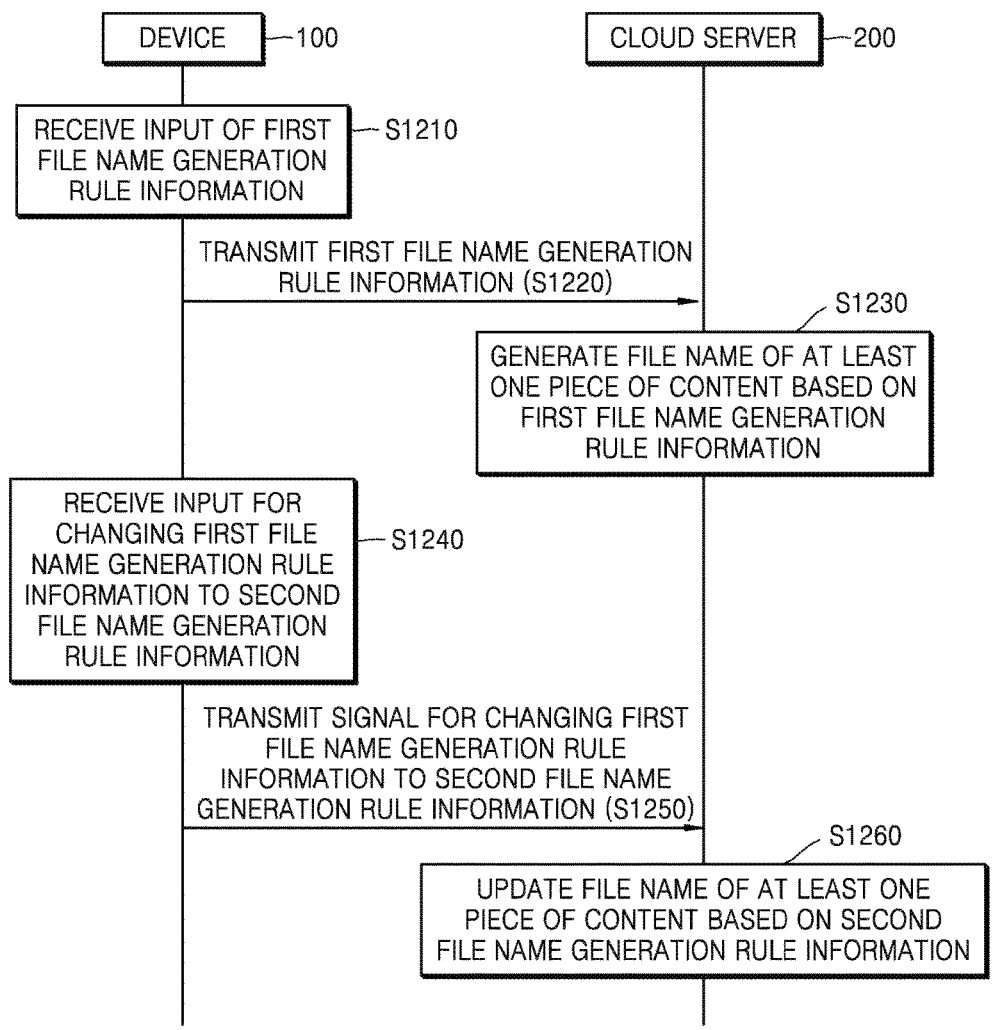
FIG. 12 is a flowchart of a method of updating a file name of content, according to an exemplary embodiment.

FIG. 12 is a flowchart of a method of updating a file name of the content, according to the exemplary embodiment.

In operation S1210, the device 100 may receive the first file name generation rule information from the user. For example, the device 100 may receive an input of at least one selected from the file name length information, the information about the items to be included in the file name, the information about the order of the items included in the file name, and information about the language level. This is described above with reference to FIG. 9, and thus, detailed descriptions thereof are omitted.

In operation S1220, the device 100 may transmit the first file name generation rule information to the cloud server 200. According to the present embodiment, the device 100 may be one of the devices linked with the first account information. For example, the device 100 may log in the cloud server 200 by using the first account information and may transmit the first file name generation rule information to the cloud server 200.

In operation S1230, the cloud server 200 may generate a file name with respect to at least one piece of content based on the first file name generation rule information. For example, if the first file name generation rule information includes item information such as 'device', 'time', 'location' and 'event', the cloud server 200 may extract the 'device information', 'time information', 'location information', and 'event information' with respect to each piece of content from the database storing the analysis information about the at least one piece of content corresponding to the first account information. In addition, the cloud server 200 may generate the file name having a format of 'device_time_location_event.avi' (e.g., glasses(HMD)_SummerVacation_Bali_Scubadiving.avi).

If the device 100 does not transmit the first file name generation rule information to the cloud server 200, the cloud server 200 may apply a default file name generation rule to generate a first file name.

In operation S1240, the device 100 may receive an input for changing the first file name generation rule information to second file name generation rule information. For example, the device 100 may receive an input for changing the items included in the first file name generation rule information and changing the arrangement order.

In operation S1250, the device 100 may transmit a signal for changing the first file name generation rule information to the second file name generation rule information. For example, the device 100 may transmit a request for generating or displaying the file name based on the second file name generation rule information, instead of the first file name generation rule information, to the cloud server 200.

In operation S1260, the cloud server 200 may update the file name of the at least one piece of content included in the content list by using the second file name generation rule information. This will be described below in more detail with reference to FIG. 13.

Figure 13:
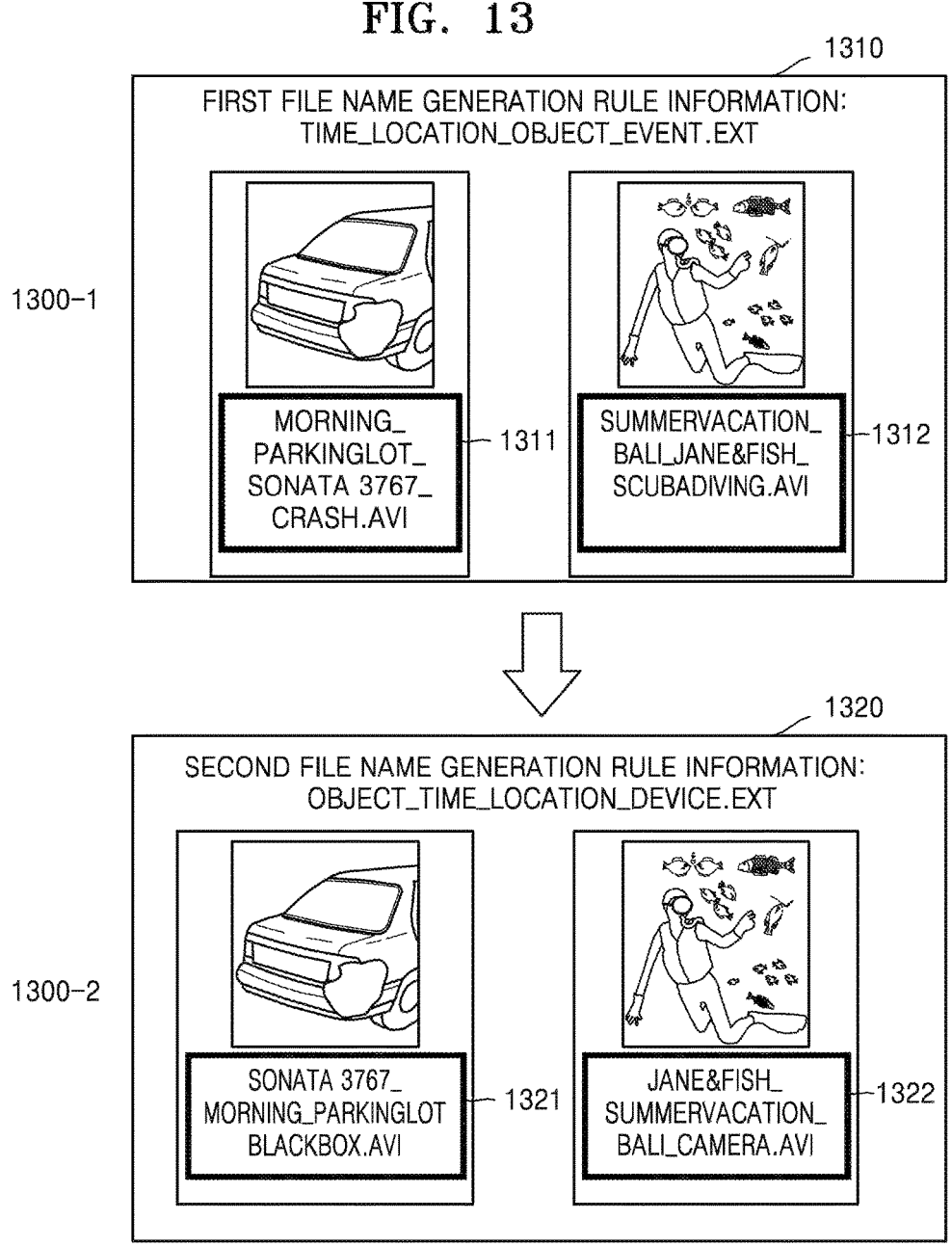
FIG. 13 is a diagram of an example of updating a file name of content based on file name generation rule changed by a cloud server.

FIG. 13 is a diagram for describing an example of updating the file name of the content by the cloud server 200 based on file name generation rule information that is changed.

As shown in 1300-1, the cloud server 200 may generate the file name based on the first file name generation rule information. For example, the cloud server 200 may generate a file name 1311 for the first content (e.g., Morning_ParkingLot_Sonata 3767_crash.avi) and a file name 1312 for the second content (e.g., SummerVacation_Bali_Jane&Fish_SkinScuba.avi) in a format of 'time_location_object_event.extension'.

When the cloud server 200 receives a request for the content list from the device 100, the cloud server 200 may provide a first content list 1310 including the file name 1311 of the first content and the file name 1312 of the second content to the device 100.

As shown in 1300-2, when the cloud server 200 receives a signal for changing the first file name generation rule information to the second file name generation rule information from the device 100, the cloud server 200 may update the file name based on the second file name generation rule information. For example, the cloud server 200 may update a file name 1321 of the first content (e.g., Sonata 3767_Morning_ParkingLot_Blackbox.avi) and a file name 1322 of the second content (e.g., Jane&Fish_SummerVacation_Bali_Camera.avi), in a format of 'object_time_location_device.extension'.

The cloud server 200 may transmit a second content list 1320 including the file name 1321 of the first content and the file name 1322 of the second content, which are updated based on the second file name generation rule information, to the device 100.

According to the present embodiment, the user may change the file name generation rule information so as to update the file name of the content included in the content list to be easily identified.

Figure 14:
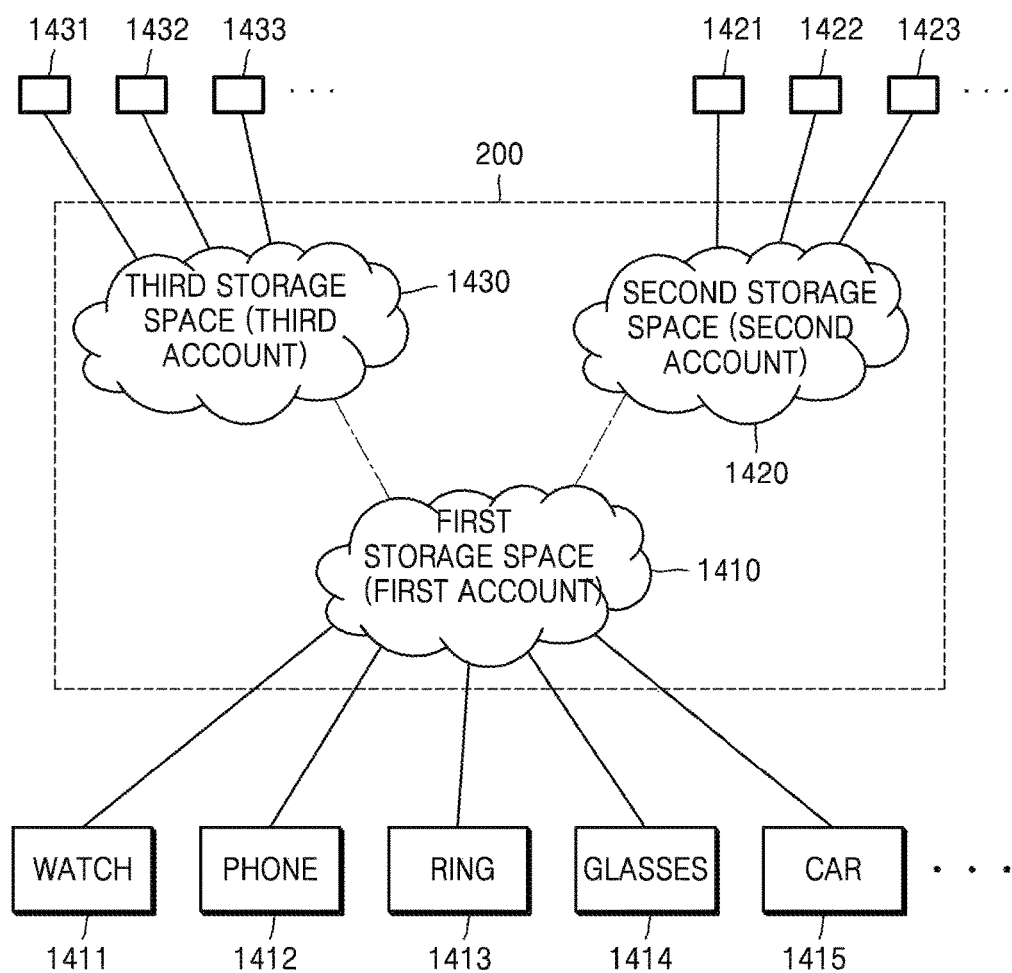
FIG. 14 is a block diagram for describing a content management system according to another exemplary embodiment.

FIG. 14 is a block diagram of a content management system according to another embodiment.

According to the present embodiment, the cloud server 200 may manage the storage space after dividing the storage space according to the account information. For example, the cloud server 200 may manage a first storage space 1410 corresponding to the first account information, a second storage space 1420 corresponding to second account information, and a third storage space 1430 corresponding to third account information.

According to the exemplary embodiment, there may be a plurality of devices linked to each piece of account information. For example, the plurality of devices linked to the first account information may include a watch 1411, a mobile phone 1412, a ring 1413, glasses 1414, and a car 1415, but are not limited thereto.

According to the present embodiment, the cloud server 200 may store the content transmitted from each of the plurality of devices connected thereto via the first account information in the first storage space 1410. Also, the cloud server 200 may store the content transmitted from each of the plurality of devices connected thereto via the second account information in the second storage space 1420.

According to the exemplary embodiment, the cloud server 200 may acquire analysis information about at least one piece of content transmitted from at least one device among the plurality of devices, by using information (e.g., velocity information, luminance information, sound information, health information of the user, schedule information of the user, and SNS information of the user) collected by the plurality of devices (e.g., 1411, 1412, 1413, 1414, and 1415) linked with the first account information. This will be described later with reference to FIG. 15.

According to the exemplary embodiment, a first user using the first storage space 1410 and a second user using the second storage space 1420 may agree with each other in advance on sharing the storage spaces. In this case, the cloud server 200 may store the at least one piece of content transmitted from the plurality of devices (e.g., 1411, 1412,

1413, 1414, and 1415) linked to the first account information in the second storage space 1420. This will be described in more detail later with reference to FIG. 24.

Figure 15:
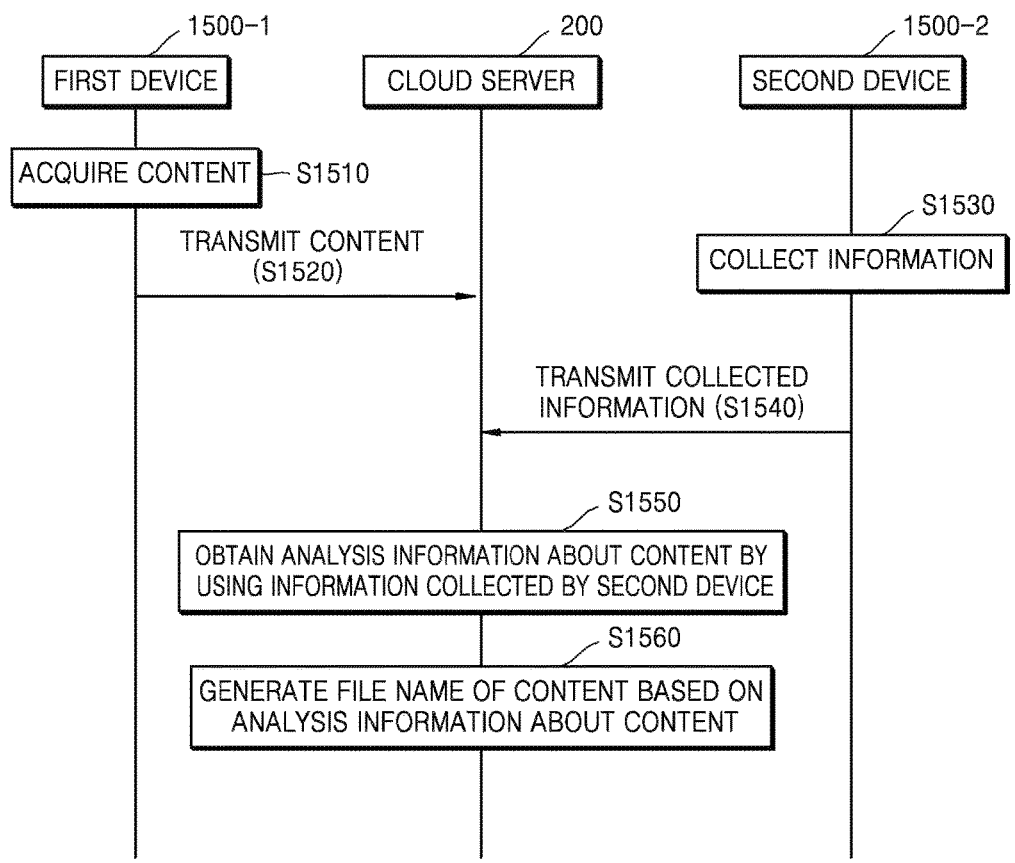
FIG. 15 is a flowchart of a method of generating a file name with respect to a content by using information collected from a plurality of devices in a cloud server, according to an exemplary embodiment.

FIG. 15 is a flowchart of a method of generating a file name of content by using the information collected by a plurality of devices in the cloud server 200, according to an exemplary embodiment.

In operation S1510, a first device 1500-1 may acquire content. According to the exemplary embodiment, the first device 1500-1 may acquire content manually based on user input, or automatically acquire the content when sensing a certain event.

For example, if a user input for selecting a capture button is received, the first device 1500-1 may acquire a capture image by using an image sensor. Also, the first device 1500-1 may take a video at a predetermined interval or when an event, in which a certain object is sensed, occurs.

In operation S1520, the first device 1500-1 may transmit the content to the cloud server 200.

According to the exemplary embodiment, the first device 1500-1 may upload the content to the cloud server 200 when the user requests, or may upload the content to the cloud server 200 when generating the content or sensing a certain event. In addition, the first device 1500-1 may upload the content to the cloud server 200 irregularly or regularly.

According to the exemplary embodiment, the first device 1500-1 may upload the content to the cloud server 200 via at least one selected from a LAN, a WAN, a mobile radio communication network, a short range communication network, and a satellite communication network. For example, the first device 1500-1 may upload the content to the cloud server 200 by using wireless fidelity (WiFi), 3G/LTE, or Bluetooth.

In operation S1530, a second device 1500-2 may collect information. For example, the second device 1500-2 may collect at least one selected from the velocity information, the luminance information, the sound information, the health information of the user, the schedule information of the user, and the SNS information of the user, but is not limited thereto.

According to the exemplary embodiment, the second device 1500-2 may collect a location of the second device 1500-2, status information of the user, information about applications used in the second device 1500-2, sent/received message information, e-mail information, call history information, web page usage information, and payment information.

The second device 1500-2 may include various sensors for collecting information. For example, the second device 1500-2 may include an acceleration sensor, a tilt sensor, a Gyro sensor, a 3-axis magnetic sensor, a voice recognition sensor, an luminance sensor, a temperature sensor, an image sensor (e.g., camera), and a touch sensor, but is not limited thereto.

In operation S1540, the second device 1500-2 may transmit the collected information to the cloud server 200.

The second device 1500-2 may transmit the collected information to the cloud server 200 when receiving a user request or when collecting the information or sensing a certain event. In addition, according to the exemplary embodiment, the second device 1500-2 may transmit the collected information to the cloud server 200 regularly or irregularly.

According to the exemplary embodiment, the second device 1500-2 may transmit information that is collected via at least one selected from a LAN, a WAN, the mobile radio communication network, the short range communication network, and the satellite communication network to the cloud server 200. For example, the second device 1500-2 may transmit information collected by using WiFi, 3G/LTE, or Bluetooth to the cloud server 200.

In operation S1550, the cloud server 200 may acquire analysis information about the content by further using the information collected by the second device 1500-2. For example, the cloud server 200 may acquire the analysis information about the content transmitted from the first device 1500-1 by using the information collected by the second device 1500-2, in addition to the information collected by the first device 1500-1. In this case, the information used to analyze the content may be enriched.

In operation S1560, the cloud server 200 may generate the file name of the content based on the analysis information of the content.

For example, the cloud server 200 may generate the file name of the content transmitted from the first device 1500-1 by using the information collected by the plurality of devices (e.g., the first device 1500-1 and the second device 1500-2). Here, the cloud server 200 may generate the file name of the content according to the file name generation rule information that is set in advance. This will be described in more detail below with reference to FIGS. 16 to 18.

Figure 16:
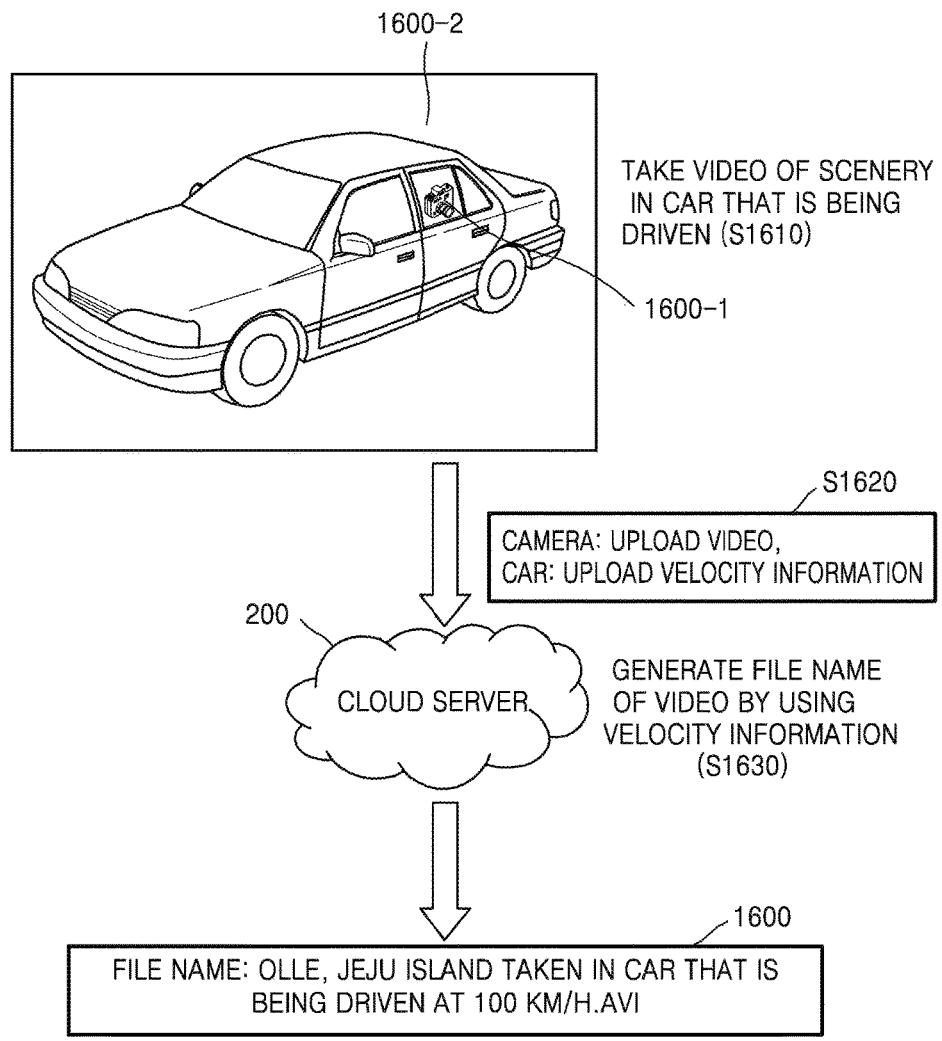
FIG. 16 is a diagram for describing an example of generating a file name of video content obtained via a camera by using velocity information obtained from a car, in a cloud server.

FIG. 16 is a diagram for describing an example of generating a file name of video content obtained through a camera 1600-1 by using velocity information obtained by a car 1600-2, in the cloud server 200. In FIG. 16, the camera 1600-1 and the car 1600-2 may be logged in the cloud server 200 via the first account information.

In operation S1610, the user may take a video of scenery by using the camera 1600-1 in the car 1600-2 driving at a velocity of 100 km/h.

In operation S1620, the camera 1600-1 may upload the video of the scenery to the cloud server 200. In addition, the car 1600-2 may upload the velocity thereof regularly to the cloud server 200. Also, according to the exemplary embodiment, the camera 1600-1 and the car 1600-2 may upload location information (e.g., Olle, Jeju island) regularly to the cloud server 200.

In operation S1630, the cloud server 200 may generate a file name of the video transmitted from the camera 1600-1 by using the velocity information transmitted from the car 1600-2.

For example, if the camera 1600-1 and the car 1600-2 are located at the same location (e.g., Olle, Jeju island), the cloud server 200 may identify the velocity information (e.g., 100 km/h) that is uploaded from the car 1600-2 when the video is transmitted from the camera 1600-1. Here, the cloud server 200 may generate the file name of the video as 'Olle in Jeju island taken in a car that is being driven at 100 km/h.avi' 1600.

Figure 17:
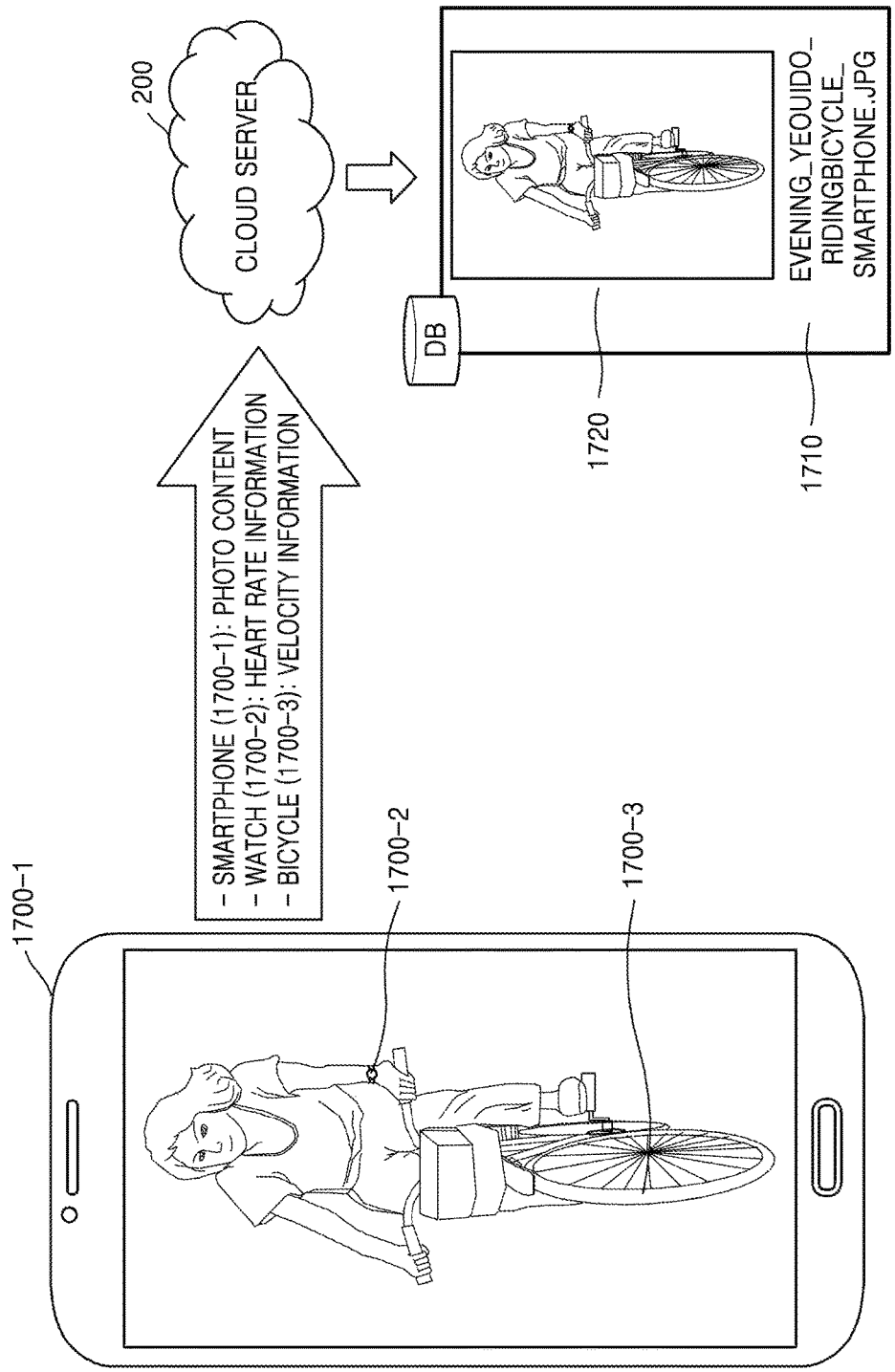
FIG. 17 is a diagram for describing an example of generating a file name of photo content obtained from a smartphone by using heart rate information obtained from a watch and velocity information obtained from a bicycle, in a cloud server.

FIG. 17 is a diagram for describing an example of generating a file name of photo content obtained from a smart phone 1700-1 by using heart rate information obtained from a watch 1700-2 and velocity information obtained from a bicycle 1700-3, in the cloud server 200.

In FIG. 17, a case where a first user wearing the watch 1700-2 rides the bicycle 1700-3 with a friend and the friend photographs the first user by using the smartphone 1700-1 of the first user will be described as an example. Here, the smartphone 1700-1, the watch 1700-2, and the bicycle 1700-3 may be in logged-in states in the cloud server 200 via account information of the first user.

The smartphone 1700-1 may obtain photo content, in which the first user wearing the watch 1700-2 is riding the bicycle 1700-3. Here, the smartphone 1700-1 may upload the photo content to the cloud server 200 manually or automatically.

According to the exemplary embodiment, the watch 1700-2 may regularly acquire the heart rate information of the first user. In addition, the watch 1700-2 may regularly upload the heart rate information to the cloud server 200. In addition, in the present embodiment, the bicycle 1700-3 may regularly upload the velocity information to the cloud server 200. The smartphone 1700-1, the watch 1700-2, and the bicycle 1700-3 may upload location information (e.g., Yeouido) to the cloud server 200.

According to the exemplary embodiment, the cloud server 200 may acquire analysis information about the photo content. For example, the cloud server 200 may identify that the object included in the photo content is the first user, the watch 1700-2 of the first user, and the bicycle 1700-3 of the first user through image processing on the photo content.

Here, the cloud server 200 may extract the heart rate information (e.g., 120) transmitted from the watch 1700-2 and the velocity information (e.g., 10 km/h) transmitted from the bicycle 1700-3 when the photo content is transmitted. If the heart rate of the first user is 120 and the velocity of the bicycle 1700-3 is 10 km/h when the photo content is transmitted from the smartphone 1700-1, the cloud server 200 may acquire the analysis information that the first user was riding the bicycle 1700-3 when being photographed by the smartphone 1700-1.

Therefore, the cloud server 200 may generate a file name of the photo content by using the analysis information of the photo content. Here, the cloud server 200 may generate the file name to correspond to the first file name generation rule information (e.g., time_location_event_object_device.extension). For example, the cloud server 200 may generate a file name 1710, that is, 'Evening_Yeouido_ridingBicycle_me_smartphone.JPG'. Also, the cloud server 200 may generate a thumbnail image 1720 of the photo content.

According to the exemplary embodiment, the cloud server 200 may store the file name 1710 and the thumbnail image 1720 mapped with each other. In addition, when a request for the content list is transmitted from the smartphone 1700-1, the cloud server 200 may provide the content list including the file name 1710 of the photo content and the thumbnail image 1720 to the smartphone 1700-1.

Figure 18:
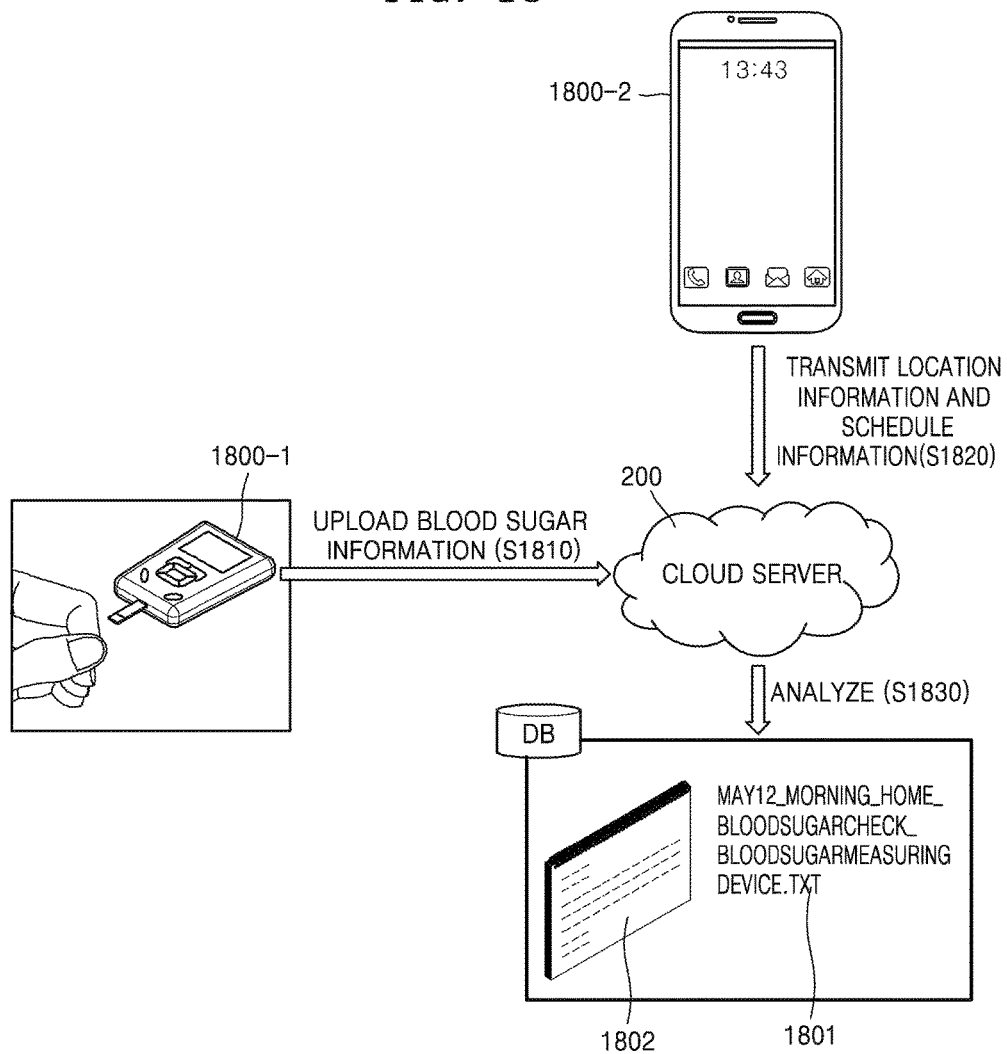
FIG. 18 is a diagram for describing an example of generating a file name of blood sugar information obtained via a blood-glucose monitoring device by using location information and schedule information obtained from a smartphone, in a cloud server.

FIG. 18 is a diagram for describing an example of generating blood sugar information obtained by a blood-glucose measuring device 1800-1 by using location information and schedule information obtained from a smartphone 1800-2, in the cloud server 200. In FIG. 18, the blood-glucose measuring device 1800-1 and the smartphone 1800-2 may be in logged in states in the cloud server 200 via the account information of the first user.

In operation S1810, the blood-glucose measuring device 1800-1 measures the blood sugar of the first user to obtain the blood sugar information of the first user. Here, the blood-glucose measuring device 1800-1 may transmit the blood sugar information of the first user to the cloud server 200.

In operation S1820, the smartphone 1800-2 of the first user may regularly upload the location information and the schedule information of the first user to the cloud server 200.

In operation S1830, the cloud server 200 may analyze the blood sugar information of the first user when receiving the blood sugar information from the blood-glucose measuring device 1800-1. Here, the cloud server 200 may generate a file name of the blood sugar information of the first user, by taking into account the location information and the schedule information of the first user transmitted from the smartphone 1800-2 of the first user. For example, the cloud server 200 may generate a file name 1801 of the blood sugar information as 'May12_Morning_house_blood-sugar check_blood-glucose measuring device.txt'.

In addition, the cloud server 200 may generate a thumbnail image 1802 representing that blood sugar is the text file. In addition, the cloud server 200 may store the file name 1801 and the thumbnail image 1802 of the blood sugar information after mapping the file name 1801 and the thumbnail image 1802 to each other.

When a request for the content list is transmitted from the smartphone 1800-2, the cloud server 200 may provide the content list including the file name 1801 and the thumbnail image 1802 of the blood sugar information to the smartphone 1800-2.

Figure 19:
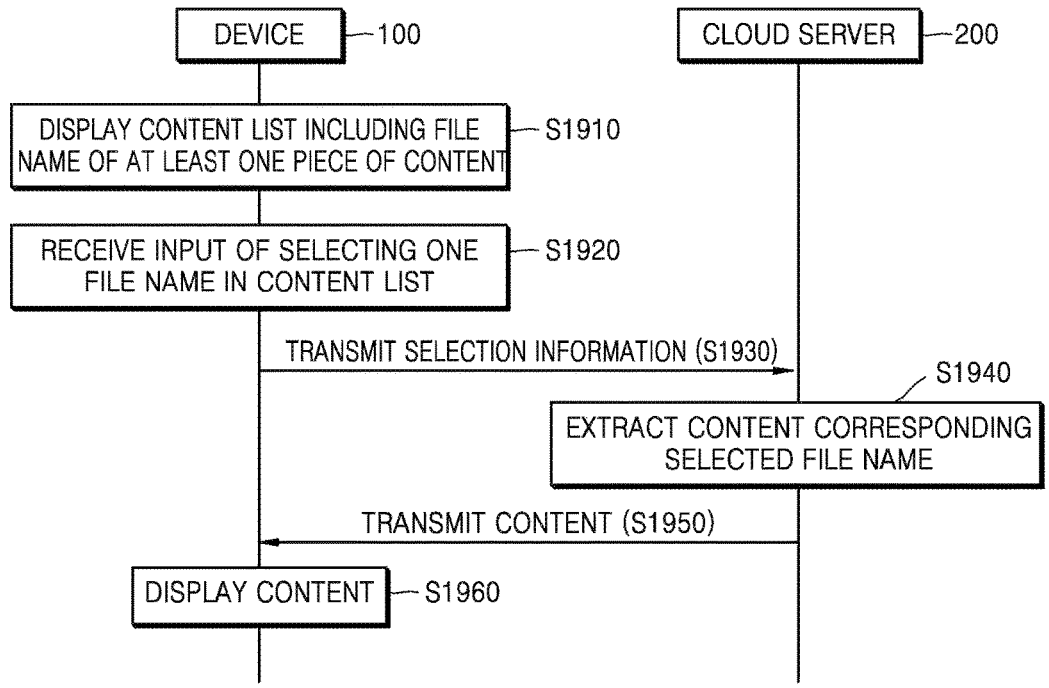
FIG. 19 is a flowchart of a method of providing content corresponding to a selected file name from a content list, according to an exemplary embodiment.

FIG. 19 is a flowchart of a method of providing content corresponding to the selected file name from the content list, according to an exemplary embodiment.

In operation S1910, the device 100 may display a content list including a file name of at least one piece of content. The at least one piece of content may be content stored in the cloud server 200 in advance or content corresponding to the first account information.

According to the present embodiment, the device 100 may display a content list further including a thumbnail image corresponding to the at least one piece of content. Also, the device 100 may display a content list including at least one folder that is generated according to a predetermined criterion.

In operation S1920, the device 100 may receive an input for selecting one file name in the content list. For example, the user of the device 100 may select a file name 'Evening_Yeouido_RidingBicycle_smartphone.JPG' from a content list 1000 shown in FIG. 10.

According to the exemplary embodiment, the input for selecting the file name may be various. For example, the input for selecting the file name may be at least one selected from a touch input, a voice input, a key input, a motion input, and an eyeball input, but is not limited thereto.

In operation S1930, the device 100 may transmit selection information for selecting one file name in the content list 1000 to the cloud server 200. For example, the device 100 may transmit the information about the selected file name and the identification information of the content corresponding to the selected file name (e.g., index information and link information) to the cloud server 200.

In operation S1940, the cloud server 200 may extract the content corresponding to the selected file name. For example, the cloud server 200 may extract the content mapped with the selected file name from the content database corresponding to the first account information.

In operation S1950, the cloud server 200 may transmit the content corresponding to the selected file name to the device 100. According to the exemplary embodiment, the cloud server 200 may transmit the content to the device 100 in a downloading method or a streaming method.

Also, the cloud server 200 may transmit the content itself to the device 100 or may provide link information, through which the device 100 may access the content, (e.g., uniform/universal resource location (URL)), to the device 100.

In operation S1960, the device 100 may display the content transmitted from the cloud server 200. Here, displaying of the content may include reproducing the content.

Figure 20:
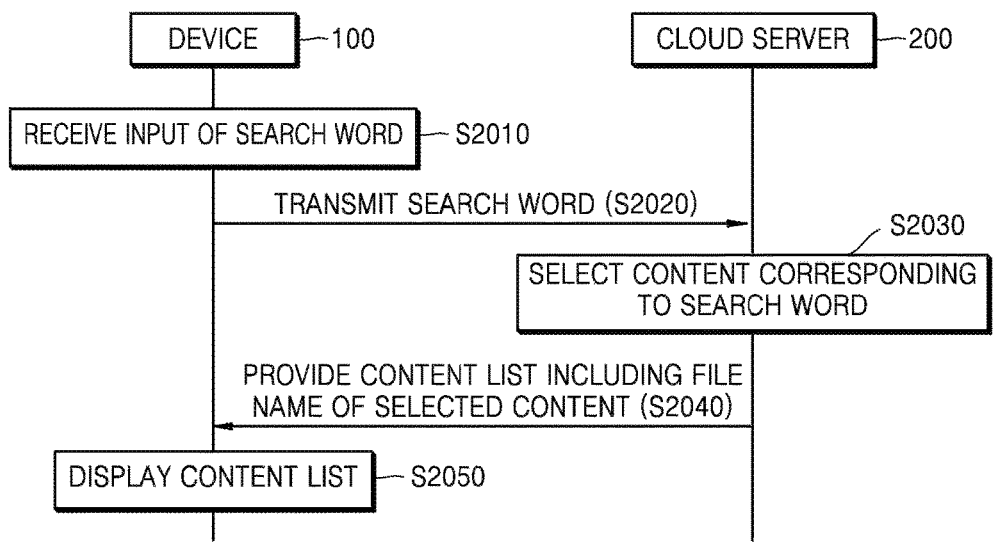
FIG. 20 is a flowchart of a method of providing a content list including a file name of content selected based on a search word, according to an exemplary embodiment.

FIG. 20 is a flowchart of a method of providing a content list including a file name of content selected based on a search word, according to an exemplary embodiment.

In operation S2010, the device 100 may receive an input of a search word. For example, the user may input a search word for searching for certain content to the device 100.

According to the present embodiment, the search word may be one or more words. For example, the search word may include at least one selected from an object name, a place name, time information, an event name, and a device name, but is not limited thereto.

According to the present embodiment, the device 100 may receive an input for selecting one of a plurality of search words.

In operation S2020, the device 100 may transmit the search word to the cloud server 200. Here, according to the present embodiment, the device 100 may be in a logged-in state in the cloud server 200 by using the first account information.

In operation S2030, the cloud server 200 may select content corresponding to the search word. The content corresponding to the search word may be one piece of content or pieces of content.

For example, the cloud server 200 may select the content corresponding to the search word from among the at least one piece of content related to the first account information. The at least one piece of content related to the first account information may be transmitted from the at least one device that is logged in the cloud server 200 by the first account information.

In operation S2040, the cloud server 200 may provide the content list including the file name of the selected content to the device 100. Here, the file name of the selected content may be generated based on the analysis information about the selected content. Also, the file name of the selected content may be generated according to the first file name generation rule information corresponding to the first account information.

In operation S2050, the device 100 may display the content list including the file name of the selected content. This will be described below in more detail with reference to FIG. 21.

Figure 21:
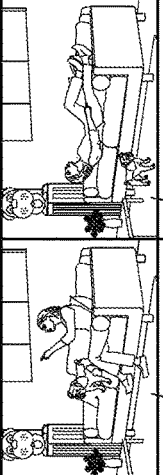
FIG. 21 is a diagram of an example of a GUI for searching for at least one piece of content stored in a cloud server.

FIG. 21 is a diagram of an example of a GUI to search for at least one piece of content stored in the cloud server 200.

As shown in FIG. 21, the device 100 may receive an input of a search word related to an object 2101, a date 2102, a place 2103, an event 2104, and a generating device 2105. For example, the device 100 may receive an input of the search word such as 'AAA (girlfriend)', 'BBB (puppy)', 'last week', 'home', or 'camera'. In this case, the device 100 may transmit the search word such as 'AAA (girlfriend)', 'BBB (puppy)', 'last week', 'home', or 'camera' to the cloud server 200.

The cloud server 200 may extract first photo content 2110 and second photo content 2120 that include 'AAA' and 'BBB' and were taken last week by the camera in the house. The cloud server 200 may provide a content list including the first photo content 2110 and the second photo content 2120 to the device 100.

The device 100 may display the content list including the first photo content 2110 and the second photo content 2120. Therefore, according to the exemplary embodiment, the user may input the search word to the device 100 to identify a list of certain content corresponding to the search word.

Figure 22:
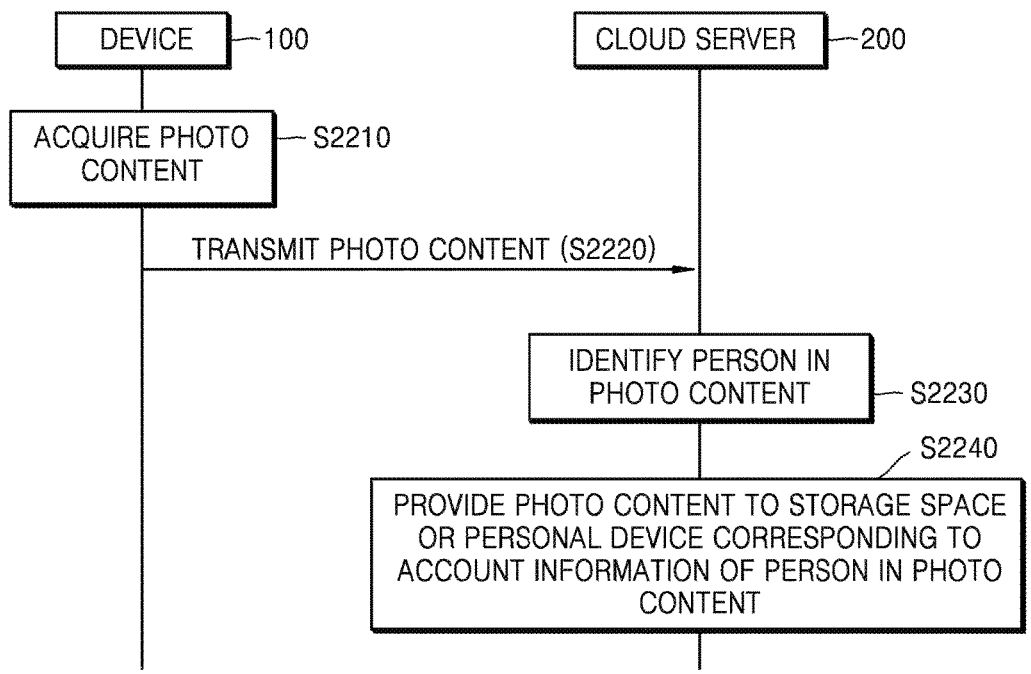
FIG. 22 is a flowchart of a method of sharing photo content with a storage space or a personal device corresponding to account information of a person in the photo content, according to an exemplary embodiment.

FIG. 22 is a flowchart of a method of sharing photo content with a storage space or a personal device corresponding to account information of a person in the photo content, according to an exemplary embodiment.

In operation S2210, the device 100 may acquire photo content. For example, the device 100 may obtain the photo content including a plurality of persons. According to the present embodiment, the device 100 may generate the photo content directly by using an image sensor or may receive the photo content from the outside.

In operation S2220, the device 100 may transmit the photo content to the cloud server 200.

According to the exemplary embodiment, the device 100 may manually update the photo content on the cloud server 200 when the user requests, or may automatically upload the photo content to the cloud server 200 when generating the photo content or sensing a certain event.

In operation S2230, the cloud server 200 may identify the persons in the photo content. For example, the cloud server 200 may perform image processing on the photo content to extract a plurality of persons from the photo content. Here, the cloud server 200 may compare the plurality of persons extracted from the photo content with the personal information database (for example, a phonebook or an SNS information database) to identify who the persons in the photo content are.

In operation S2240, the cloud server 200 may provide the photo content to a storage space or a personal device corresponding to account information of the persons in the photo content. Here, the providing of the photo content may include transmitting of the photo content or transmitting of link information for accessing the photo content.

For example, if there are a first user and a second user in the photo content, the cloud server 200 may store the photo content in the storage space corresponding to first account information of the first user and the storage space corresponding to second account information of the second user.

Also, the cloud server 200 may store the photo content only in the storage space corresponding to the first account information of the first user and may store link information to the photo content (for example, URL or file name) in the storage space corresponding to the second account information of the second user. Also, the cloud server 200 may transmit the link information of the photo content to the device of the second user. Here, the photo content stored in the storage space corresponding to the first account information may be shared. Therefore, the second user may freely access the photo content. This will be described below in more detail with reference to FIG. 23.

Figure 23:
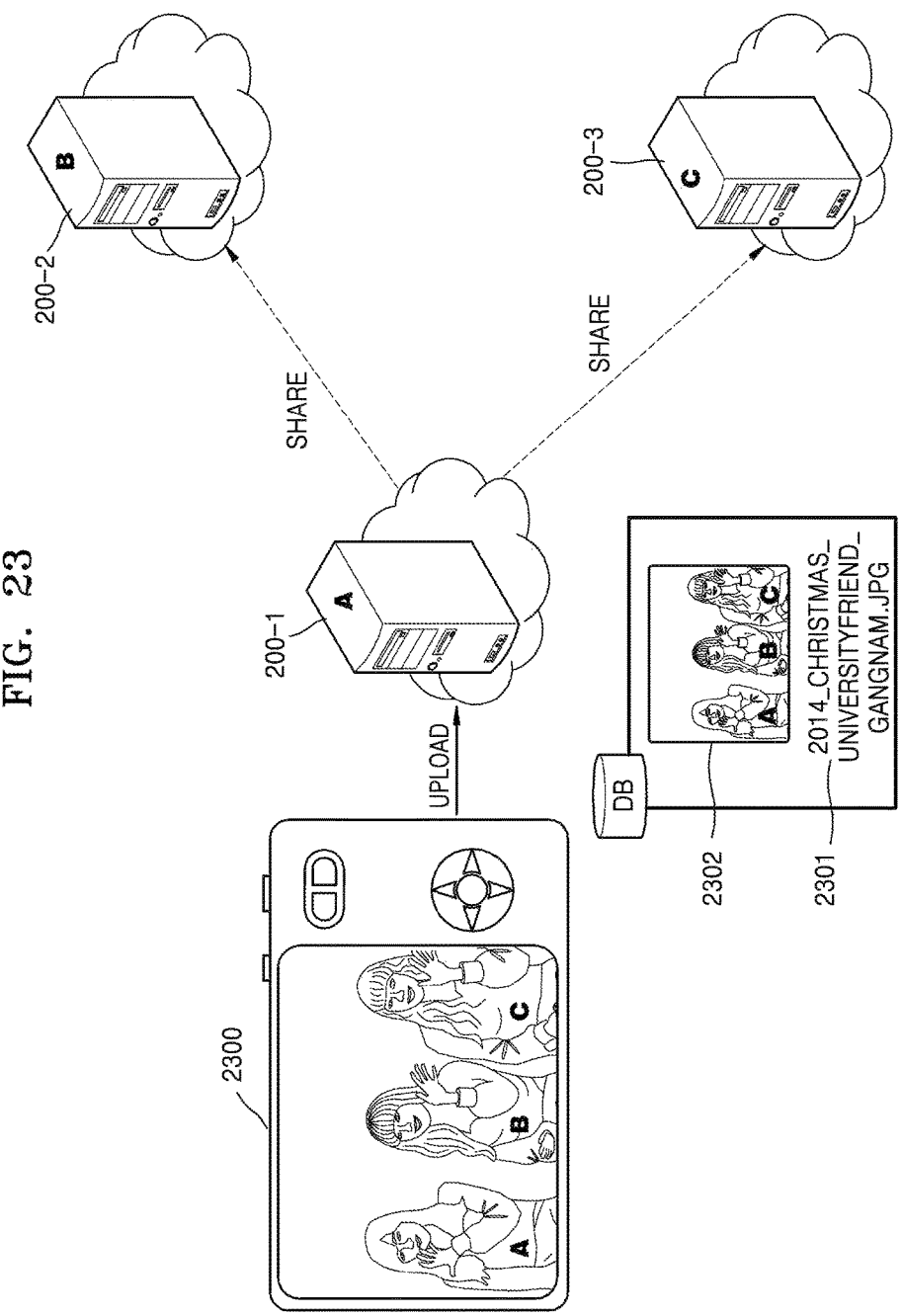
FIG. 23 is a diagram of an example of providing photo content from a cloud server to a storage space corresponding to account information of each person in the photo content.

FIG. 23 is a diagram for describing an example of providing photo content from the cloud server 200 to the storage space corresponding to account information of each person in the photo content.

As shown in FIG. 23, a camera 2300 of a user A may acquire photo content 2310 including the user A, the user B, and the user C. The camera 2300 may upload the photo content 2310 to the cloud server 200. Here, the camera 2300 may be in a logged-in state in the cloud server 200 by using the first account information of the user A.

According to the exemplary embodiment, the cloud server 200 may acquire analysis information about the photo content 2310. For example, the cloud server 200 may perform image processing on the photo content 2310, and may determine that the persons included in the photo content 2310 are the user A, the user B, and the user C. Also, the cloud server 200 may determine that the user A, the user B, and the user C are university friends by using the SNS information or the phonebook information of the user A. The cloud server 200 may determine that the photo content 2310 was taken at Gangnam, on Dec. 25, 2014, by analyzing the metadata included in the photo content 2310.

The cloud server 200 may generate a file name of the photo content 2310 by using the analysis information. For example, the cloud server 200 may generate the file name of the photo content 2310 as '2014_Christmas_University-Friend_Gangnam.JPG' 2301. Here, the cloud server 200 may map a file name 2301 and a thumbnail image 2302 of the photo content 2310 with the photo content 2310, and then, may store the photo content 2310 in a first storage space 200-1 corresponding to the account information of the user A.

According to the present embodiment, the cloud server 200 may set the photo content 2310 of the user A to be automatically shared with the user B and the user C.

For example, the cloud server 200 may store the photo content 2310 in a second storage space 200-2 corresponding to account information of the user B and in a third storage space 200-3 corresponding to account information of the user C.

Also, the cloud server 200 may store link information of the photo content 2310 in the second and third storage spaces 200-2 and 200-3 so that the devices of the user B and the user C may access the photo content 2310 stored in the first storage device 200-1. In this case, the user B and the user C may connect to the cloud server 200 by using the devices thereof via the account information of the user B and the user C to identify the photo content 2310.

According to the present embodiment, the cloud server 200 sets the photo content 2310 in a shared state when a request for sharing the photo content is transmitted from the camera 2300. The shared state may denote an accessible state of another user.

According to the exemplary embodiment, the camera 2300 may output a sharing check message when obtaining the photo content 2310. Here, the user A may set the photo content 2310 to be shared with the user B and the user C, to be shared only with the user B, or not to be shared with anybody via the sharing check message.

In addition, according to the exemplary embodiment, the cloud server 200 may generate the file name of the photo content 2310 to be different according to the user. Here, the cloud server 200 may store the file name generation rule information to be different according to the user.

For example, the cloud server 200 may provide the file name of the photo content 2310 to the first device of the user A as '2014_Christmas_UniversityFriend_Gangnam.JPG' 2301, may provide the file name of the photo content 2310 to the second device of the user B as 'UniversityFriend_Christmas_Gangnam_Camera.JPG', and may provide the file name of the photo content 2310 to the third device of the user C as 'ChristmasParty_UniversityFriend_Gangnam.JPG'.

Figure 24:
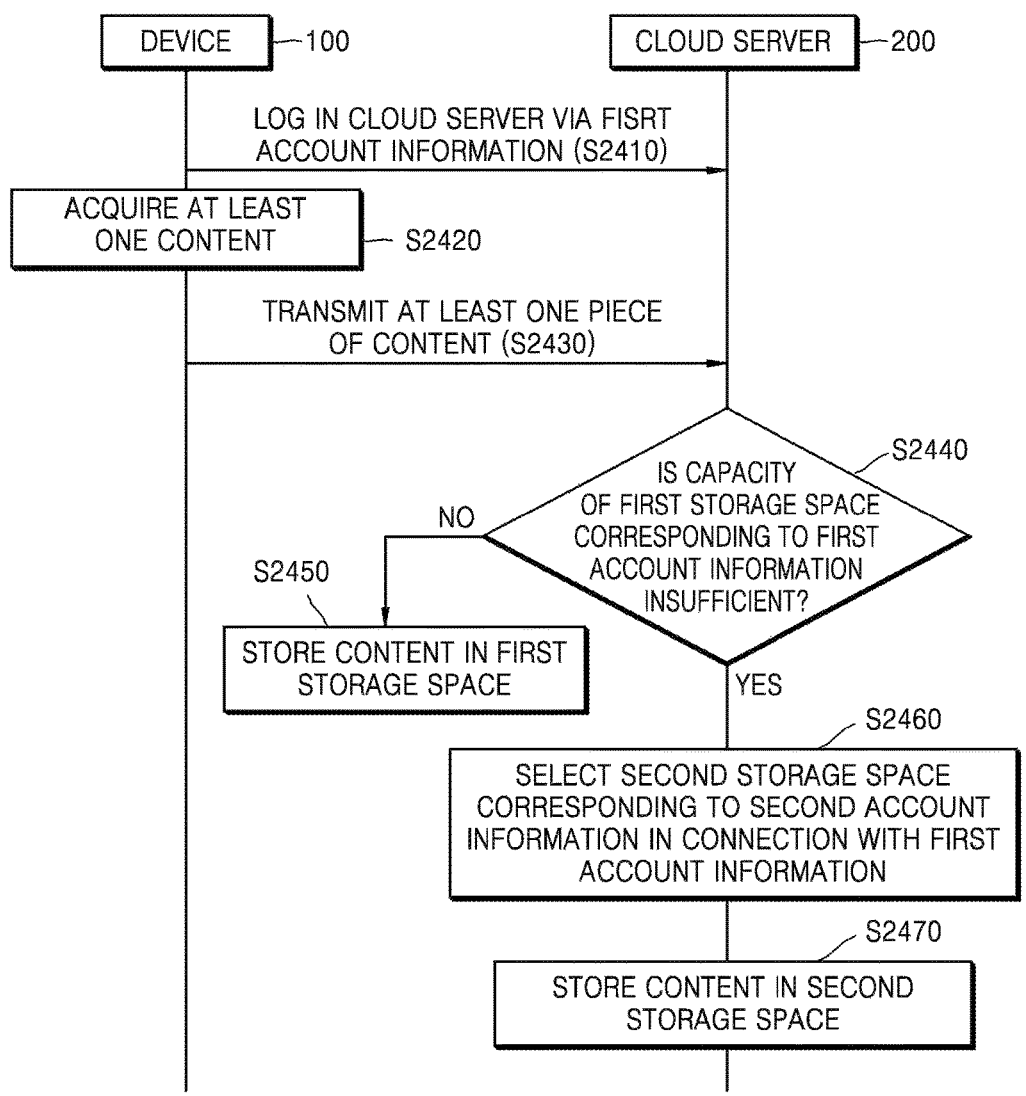
FIG. 24 is a flowchart of a method of storing content after distributing the content to a plurality of storage spaces, according to an exemplary embodiment.

FIG. 24 is a flowchart of a method of storing the content after distributing to a plurality of storage spaces, according to an exemplary embodiment.

In operation S2410, the device 100 may log in the cloud server 200 by using the first account information. For example, if the device 100 transmits the first account information to the cloud server 200, the cloud server 200 may perform certification of the first account information.

In operation S2420, the device 100 may acquire at least one piece of content.

In operation S2430, the device 100 may transmit the at least one piece of content to the cloud server 200. Since operation S2420 and operation S2430 correspond to operation S1510 and operation S1520 of FIG. 15, detailed descriptions thereof are omitted here.

In operation S2440, the cloud server 200 may determine whether a capacity of the first storage space corresponding to the first account information is insufficient. According to the exemplary embodiment, the cloud server 200 may allocate a storage space of a certain capacity (for example, 50 GB) to each account.

In addition, in the present specification, lacking capacity of the storage space may denote a case where a remaining capacity of the storage space is equal to or less than a threshold value (for example, 1 GB or 5% of the entire capacity).

In operation S2450, if the capacity of the first storage space corresponding to the first account information is sufficient, the cloud server 200 may store the at least one piece of content transmitted from the device 100 in the first storage space.

In operation S2460, if it is determined that the capacity of the first storage space corresponding to the first account information is insufficient, the cloud server 200 may select the second storage space corresponding to the second account information connected to the first account information. The second account information may be information about the account of the second user who certifies to share the storage space with the first user of the first account information.

According to the present embodiment, if there are pieces of account information connected to the first account information, the cloud server 200 may select the second storage space corresponding to the second account information based on information about remaining capacities in the plurality of storage spaces corresponding to the pieces of account information. For example, the cloud server 200 may select the second storage space that has the largest remaining capacity from among the plurality of the storage spaces corresponding to the pieces of account information.

In operation S2460, the cloud server 200 may store the at least one piece of content transmitted from the device 100 in the second storage space.

For example, the cloud server 200 may store the at least one piece of content in the second storage space corresponding to the second account information of the second user who certifies to share the storage space with the first user of the device 100. In addition, the cloud server 200 may store the second account information (or link information of the content) and the file name of the at least one piece of content in the first storage space corresponding to the first account information, after mapping the second account information and the at least one piece of content to each other.

Therefore, according to the present embodiment, if the capacity of the first storage space corresponding to the first account information of the first user is insufficient, the cloud server 200 may store the content of the first user in the storage space of another user.

Figure 25:
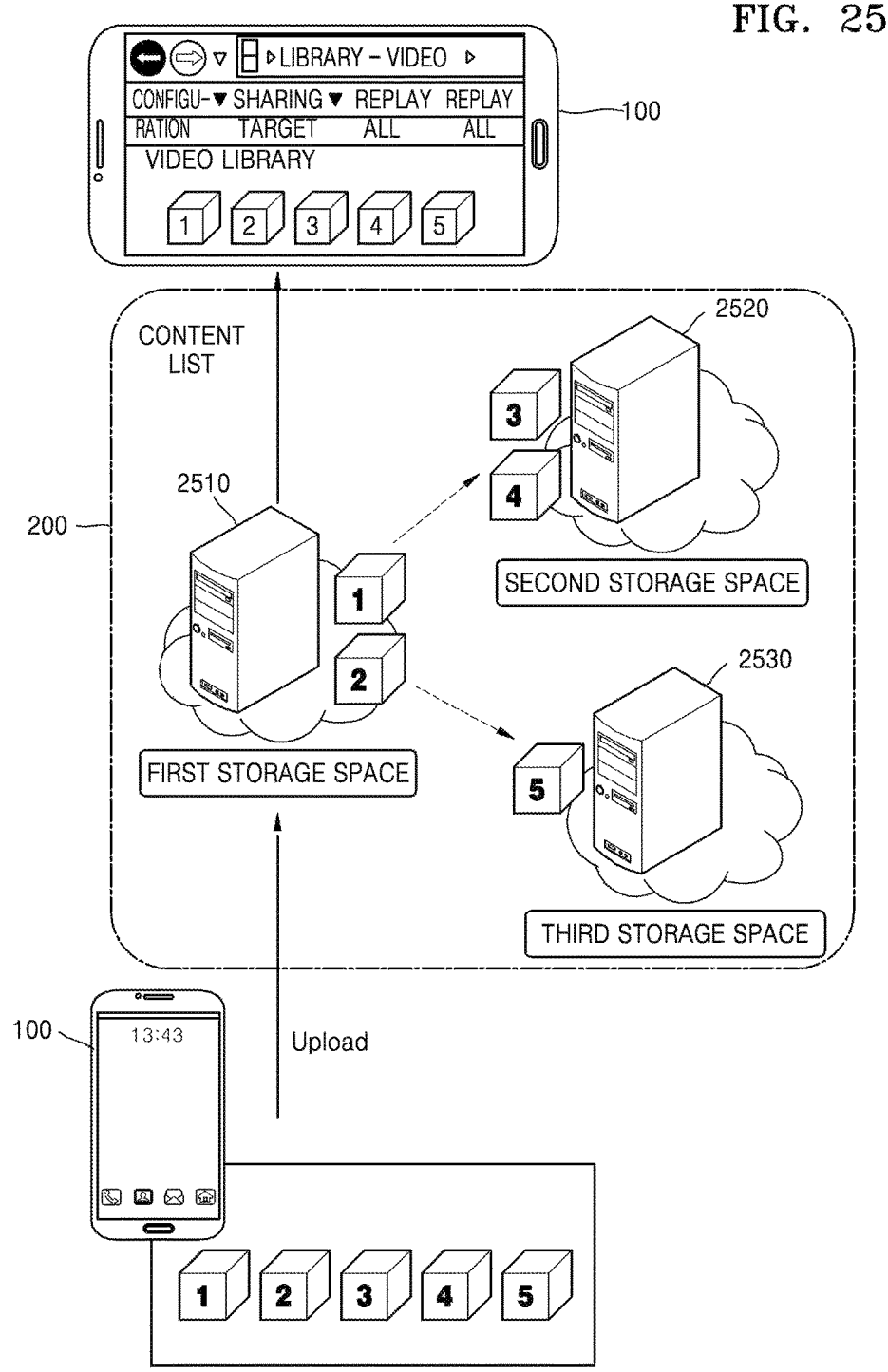
FIG. 25 is a diagram of an example of storing a plurality of contents in a plurality of storage spaces by a cloud server.

FIG. 25 is a diagram for describing an example of storing pieces of content in a plurality of storage spaces by the cloud server 200.

In FIG. 25, a case where a first user (for example, son), a second user (for example, father), and a third user (for example, mother) certify to share the storage spaces with one another will be described as an example.

When first to fifth content is uploaded from the device 100 of the first user, the cloud server 200 may store the first content to the fifth content to be distributed in a first storage space 2510 of the first user, a second storage space 2520 of the second user, and a third storage space 2530 of the third user. For example, the cloud server 200 may store the first content and the second content in the first storage space 2510, store the third content and the fourth content in the second storage space 2520, and store the fifth content in the third storage space 2530.

If a request for the content list is transmitted from the device 100 of the first user, the cloud server 200 may extract the first content to the fifth content corresponding to the account information of the first user. The cloud server 200 may provide a content list including file names of the first content to the fifth content to the device 100 of the first user.

According to the exemplary embodiment, the first content to the fifth content may be the content transmitted from each of a plurality of devices of the first user. The plurality of devices of the first user may be in logged in states in the cloud server 200 by using the account information of the first user.

Figure 26:
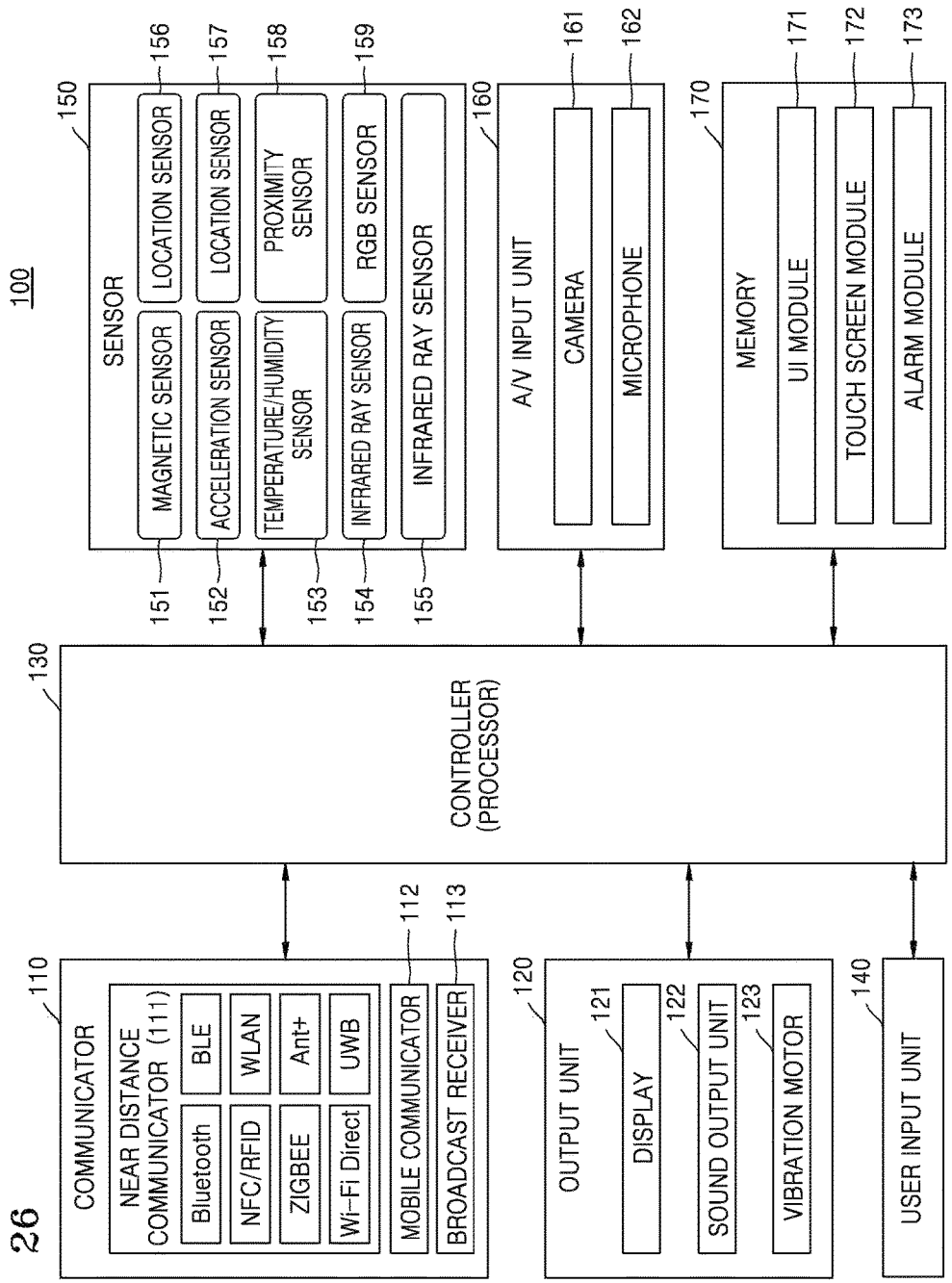
FIG. 26 is a block diagram of a device according to an exemplary embodiment.

FIG. 26 is a block diagram of the device 100 according to an exemplary embodiment.

As shown in FIG. 26, the device 100 may include a communicator 110, an output unit 120, a controller 130, a user input unit 140, a sensor 150, an audio/video (A/V) input unit 160, and a memory 170. However, not all shown elements are necessary elements. That is, the device 100 may be embodied with more or less elements than the shown elements.

Hereinafter, the elements will be described.

The communicator 110 may include one or more elements allowing communication between the device 100 and an external device or between the device 100 and the cloud server 200. For example, the communicator 110 may include a short-range communicator 111, a mobile communicator 112, and a broadcast receiver 113.

The short-range wireless communicator 111 may include, but is not limited to, a Bluetooth communicator, a Bluetooth low energy (BLE) communicator, a Near Field Communication (NFC) unit, a WLAN (Wi-Fi) communicator, a ZigBee communicator, an IrDA communicator, a Wi-Fi direct (WFD) communicator, an ultra wideband (UWB) communicator, or an Ant+ communicator.

The mobile communicator 112 exchanges a wireless signal with at least one selected from a base station, an external terminal, and the cloud server 200 on a mobile communication network. The wireless signal may include various types of data according to transmission of a sound call signal, a moving picture call signal, or a text/multimedia message.

The broadcast receiver 113 receives a broadcast signal and/or information related to a broadcast from the outside through a broadcast channel. The broadcast channel may include a satellite channel and a ground wave channel. In another embodiment, the device 100 may not include the broadcast receiver 113.

The communicator 110 may request for certification of the account information of the user while transmitting the account information of the user to the cloud server 200. The communicator 110 may transmit the at least one piece of content to the cloud server 200 if certification of the account information has succeeded.

The communicator 110 may transmit first file name generation rule information corresponding to the first account information to the cloud server 200. The communicator 110 may transmit a signal for changing the first file name generation rule information into the second file name generation rule information to the cloud server 200.

The communicator 110 may request the cloud server 200 for a content list including at least one piece of content corresponding to the account information and may receive the content list including the file name of the at least one piece of content from the cloud server 200.

The communicator 110 may receive the at least one piece of content included in the content list from the cloud server 200. Here, the communicator 110 may receive the content by using a downloading method or using a streaming method.

The output unit 120 outputs an audio signal, a video signal, or a vibration signal, and may include a display 121, a sound output unit 122, and a vibration motor 123.

The display 121 displays and outputs the information processed by the device 100. For example, the display 121 may display the content list transmitted from the cloud server 200. Here, the content list may include the file name and the thumbnail image of the content generated by the cloud server 200 based on the analysis information and the file name generation rule information. According to the present embodiment, the display 121 may display the content list according to categories or folders.

The display 121 may display the GUI for setting the file name generation rule. The GUI for setting the file name generation rule may include at least one selected from a field for selecting items to be included in the file name, a field for determining an order of arranging the items included in the file name, and a field for displaying an example of the file name, but is not limited thereto.

The display 121 may output a sharing check message for sharing the content between the plurality of users included in the content.

In addition, if the display 121 and a touch pad form a mutual layer structure and then are formed as a touch screen, the display 121 may be used as both an output device and input device. The display 121 may include at least one of a liquid crystal display (LCD), a thin film transistor-liquid crystal display (TFT-LCD), an organic light-emitting diode (OLED) display, a flexible display, a 3D display, and an electrophoretic display. Also, according to a type of the device 100, the device 100 may include at least two displays.

The sound output unit 122 may output audio data that is received from the communicator 110 or is stored in the memory 170. The sound output unit 122 may also output a sound signal (e.g., a call signal receiving sound, a message receiving sound, a notifying sound, or the like) related to capabilities performed by the device 100. The sound output unit 122 may include a speaker, a buzzer, or the like.

The vibration motor 123 may output a vibration signal. For example, the vibration motor 123 may output the vibration signal that corresponds to an output of the audio data (e.g., the call signal receiving sound, the message receiving sound, or the like) or video data. Also, when a touch is input to the touch screen, the vibration motor 123 may output a vibration signal.

The controller 130 may generally control all operations of the device 100. That is, the controller 130 may control the communicator 110, the output unit 120, the user input unit 140, the sensor 150, and the A/V input unit 160 by executing programs stored in the memory 170.

The user input unit 140 may be a unit by which a user inputs data so as to control the first device 100. For example, the user input unit 140 may include a key pad, a dome switch, a touch pad (a touch capacitive-type touch pad, a pressure resistive-type touch pad, an infrared beam-sensing-type touch pad, a surface acoustic wave-type touch pad, an integral strain gauge type touch pad, a piezoelectric effect-type touch pad, or the like), a jog wheel, and a jog switch, but one or more embodiments are not limited thereto.

The user input unit 140 may receive an input of the account information registered in the cloud server 200 from the user. The account information may include at least one selected from an ID, a nickname, and a password, but is not limited thereto. The user input unit 140 may receive a request for uploading the content.

The user input unit 140 may receive an input about the file name generation rule information. For example, the user input unit 140 may receive an input of at least one selected from information about the file name length, information about items included in the file name, information about an order of the items included in the file name, and information about a language level.

The user input unit 140 may receive an input for selecting one piece of content from the content list transmitted from the cloud server 200.

The user input unit 140 may receive an input for setting whether the content to be shared and a target to be shared via the sharing check message. The user input unit 140 may receive an input of the search word.

The sensor 150 may sense the status of the device 100 or a peripheral status of the device 100 and transmit sensing information to the controller 130.

The sensor 150 may include at least one selected from a magnetic sensor 151, an acceleration sensor 152, a temperature/humidity sensor 153, an infrared ray sensor 154, a gyroscope sensor 155, a location sensor (for example, a GPS) 156, a pressure sensor 157, a proximity sensor 158, and an RGB (luminance) sensor 159, but is not limited thereto. Functions of the above sensors may be intuitively deduced by one of ordinary skill in the art from their names, and thus, detailed descriptions about the functions of the above sensors are not provided here.

The A/V input unit 160 inputs an audio signal or a video signal, and may include a camera 161 and a microphone 162. The camera 161 may obtain an image frame such as a still image or a moving picture via an image sensor during a moving picture call mode or an image-capturing mode. An image that is captured via the image sensor may be processed by the controller 130 or a separate image processor (not shown).

The image frame that is processed by the camera 161 may be stored in the memory 170 or may be transmitted to an external source via the communicator 110. According to a configuration of the device 100, two or more cameras 161 may be arranged.

The microphone 162 receives an external sound signal as an input and processes the received sound signal into electrical voice data. For example, the microphone 162 may receive a sound signal from an external device or a speaker. In order to remove noise that occurs while the sound signal is externally input, the microphone 162 may use various noise removing algorithms.

The memory 170 may store a program for processing and controlling the controller 130, or may store a plurality of pieces of input/output data (e.g., an application, content, ID information of an external device, an address book, etc.).

The memory 170 may include a storage medium of at least one type of flash memory, hard disk, multimedia card memory, card memory such as an SD or XD card memory, Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disc, and optical disc. Also, the device 100 may run web storage or a cloud server that performs a storage function of the memory 170 on the Internet.

The programs stored in the memory 170 may be classified into a plurality of modules according to their functions, for example, into a UI module 171, a touch screen module 172, an alarm module 173, etc.

The UI module 171 may provide a specialized UI or GUI in connection with the device 100 for each application. The touch screen module 172 may detect a user's touch gesture on the touch screen and transmit information related to the touch gesture to the controller 130. The touch screen module 172 may determine and analyze a touch code. The touch screen module 172 may be configured by additional hardware including a controller.

Various sensors may be arranged in or near the touch screen so as to detect a touch or a proximate touch on the touch sensor. An example of the sensor to detect the touch on the touch screen may include a tactile sensor. The tactile sensor detects a contact of a specific object at least as sensitively as a person can detect. The tactile sensor may detect various types of information such as the roughness of a contact surface, the hardness of the contact object, the temperature of a contact point, or the like.

An example of the sensor to detect the touch on the touch screen may include a proximity sensor.

The proximity sensor detects the existence of an object that approaches a predetermined detection surface or that exists nearby, by using a force of an electro-magnetic field or an infrared ray, instead of mechanical contact. Examples of the proximity sensor include a transmission-type photoelectric sensor, a direction reflection-type photoelectric sensor, a mirror reflection-type photoelectric sensor, a high frequency oscillation-type proximity sensor, a capacity-type proximity sensor, a magnetic proximity sensor, an infrared-type proximity sensor, or the like. The touch gesture of the user may include a tap gesture, a touch & hold gesture, a double tap gesture, a drag gesture, a panning gesture, a flick gesture, a drag & drop gesture, a swipe gesture, or the like.

The alarm module 173 may generate a signal for notifying the user about an occurrence of an event in the device 100. Examples of the event that may occur in the device 100 include a call signal receiving event, a message receiving event, a key signal input event, a schedule notifying event, or the like. The alarm module 173 may output an alarm signal in the form of a video signal via the display unit 121, an alarm signal in the form of an audio signal via the sound output unit 122, or an alarm signal in the form of a vibration signal via the vibration motor 123.

Figure 27:
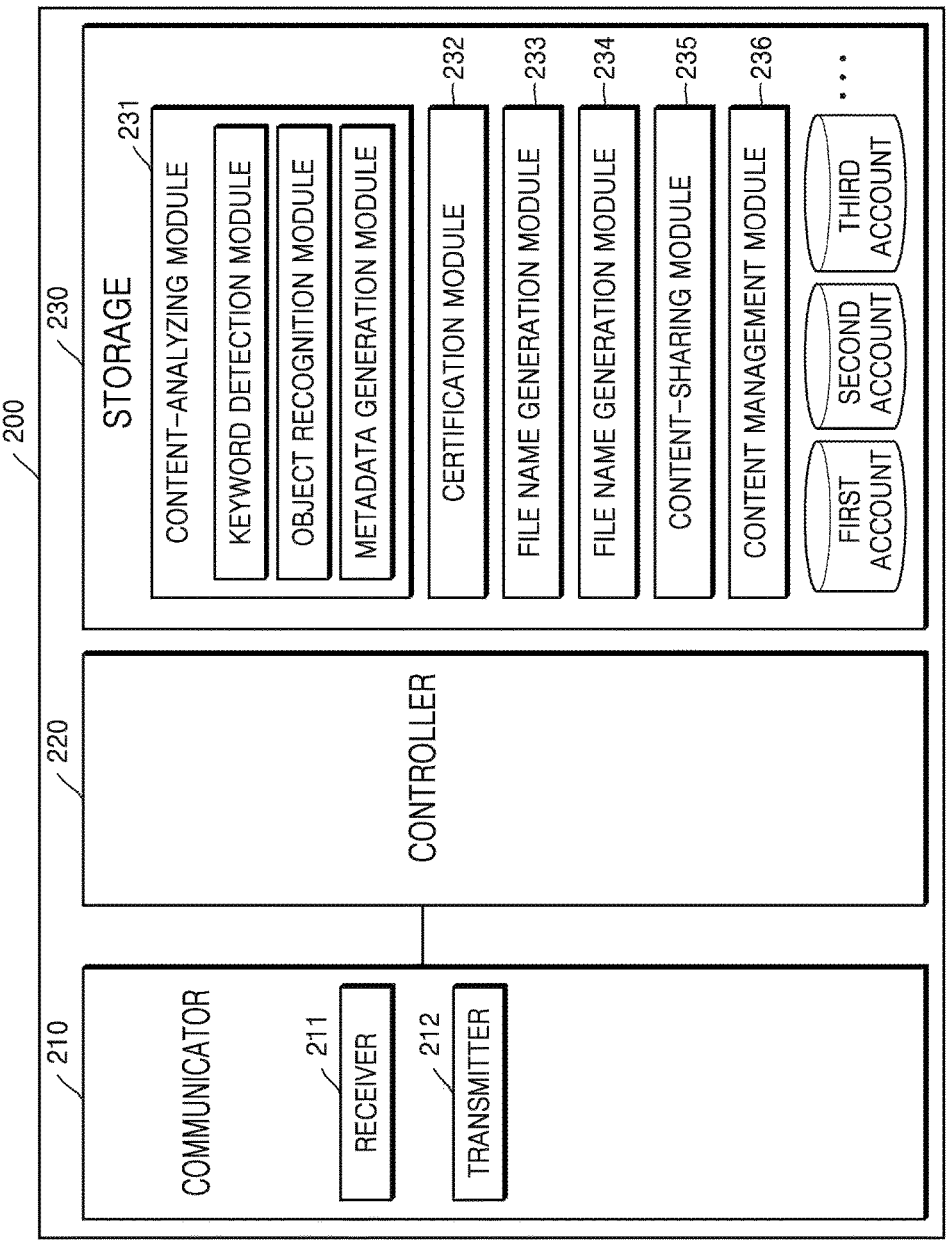
FIG. 27 is a block diagram of a cloud server according to an exemplary embodiment.

FIG. 27 is a block diagram of a cloud server 200 according to an exemplary embodiment.

As shown in FIG. 27, the cloud server 200 according to the present embodiment may include a communicator 210, a controller 220, and a storage 230. However, not all shown elements are necessary elements. That is, the cloud server 200 may be embodied with more or less elements than the shown elements.

Hereinafter, the elements will be described below.

The communicator 210 may include one or more elements allowing the cloud server 200 and the plurality of devices to communicate with each other. The communicator 210 may include a receiver 211 and a transmitter 212.

The receiver 211 may receive the first file name generation rule information from at least one device 100 in connection with the first account information. Also, the receiver 211 may receive a signal for changing the first file name generation rule information to the second file name generation rule information from the device 100. The receiver 211 may receive at least one piece of content from the device 100.

The receiver 211 may receive a request signal for a content list corresponding to the first account information from the device 100. Here, the receiver 211 may receive a search word from the device 100.

The receiver 211 may receive selection information from the device 100 for selecting one file name from the content list.

The transmitter 212 may provide the content list including the file name of the at least one piece of content to the device 100. The transmitter 212 may provide the content list further including the thumbnail image corresponding to the at least one piece of content to the device 100. The transmitter 212 may provide the content list including the file name of the content corresponding to the search word to the device 100.

The transmitter 212 may transmit the content corresponding to the selected file name in the content list to the device 100.

The controller 220 may control overall operations of the cloud server 200. For example, programs (or modules) stored in the storage 230 are executed to manage the at least one piece of content transmitted from the device 100.

The storage 230 may store programs for processing and control of the controller 220, or input/output data (for example, the content transmitted from the device 100, information about the device, and analysis information about the content).

Programs stored in the storage 230 may be classified into a plurality of modules according to functions thereof, for example, a content-analyzing module 231, a certification module 232, a file name generation module 233, a content search module 234, a content-sharing module 235, and a content management module 236.

The content-analyzing module 231 analyzes at least one piece of content to obtain analysis information about the at least one piece of content and may store the analysis information about at least one piece of content.

For example, the content-analyzing module 231 may include a keyword detection module, an object recognition module, and a metadata generation module. The keyword detection module may perform image processing, video processing, and audio processing on the at least one piece of content to detect keywords regarding the at least one piece of content. The object recognition module may compare objects detected from the content (for example, human beings, animals, objects, etc.) with the object database that is stored in advance to recognize the objects included in the content. The metadata generation module may store the analysis information about the content in a metadata format.

The content-analyzing module 231 may obtain the analysis information about the at least one piece of content by using information collected by the plurality of devices in connection with the first account information.

The certification module 232 may receive the account information from the device 100 and perform certification of the account information. For example, the certification module 232 may identify whether the transmitted account information exists already in the account information database.

The file name generation module 233 extracts the first file name generation rule information corresponding to the at least one piece of content in connection with the first account information and the first account information, and may generate the file name of the at least one piece of content by using the first file name generation rule information. Here, the file name generation module 233 may generate the file name of the at least one piece of content by using the analysis information about at least one piece of content.

The file name generation module 233 may update the file name of the at least one piece of content included in the content list by using the second file name generation rule information.

The content-searching module 234 may select the content corresponding to the search word from among the at least one piece of content related to the first account information, when the search word is transmitted from the device 100.

The content-sharing module 235 may provide the at least one piece of content to a storage space corresponding to second account information of a person included in the at least one piece of content or to a second device of the person included in the at least one piece of content.

The content-sharing module 235 may store the at least one piece of content in the storage space corresponding to the second account information in connection with the first account information. Here, the second account information may include account information of a second user that certifies to share the storage space with the first user. For example, if the capacity of the first storage space corresponding to the first account information of the first user is insufficient, the content-sharing module 235 may store the content of the first user in the storage space of another user.

The content management module 236 may store the first file name generation rule information after mapping the first file name generation rule information with the first account information.

The content management module 236 classifies the at least one piece of content into at least one group according to a predetermined criterion, and may generate a folder corresponding to the at least one group in the content list. The content management module 236 may obtain a thumbnail image corresponding to the at least one piece of content.

The content management module 236 may store the content in a compressed file format. In addition, the content management module 236 may restore the file in an original format when a download request is input.

The content management module 236 may delete the content satisfying a predetermined condition or may recommend moving the content to a hard disk of a PC. For example, the content management module 236 may delete a duplicate content, or may delete a file that was generated long ago and accessed not so frequently.

One or more embodiments may also be embodied as programmed commands to be executed in various computer units, and then may be recorded in a computer-readable recording medium. The computer-readable recording medium may include one or more of the programmed commands, data files, data structures, or the like. The programmed commands recorded to the computer-readable recording medium may be particularly designed or configured for one or more embodiments of the present invention or may be well known to one of ordinary skill in the art. Examples of the computer-readable recording medium include magnetic media including hard disks, magnetic tapes, and floppy disks, optical media including compact disc-read only memory (CD-ROMs) and digital versatile discs (DVDs), magneto-optical media including floptical disks, and hardware designed to store and execute the programmed commands in ROM, random-access memory (RAM), a flash memory, and the like. Examples of the programmed commands include not only machine code generated by a compiler but also include a high-level programming language to be executed in a computer by using an interpreter.

According to the exemplary embodiments, the cloud server 200 may provide a file name that is different according to accounts of users, or according to the preference of the user. The cloud server 200 performs analysis of the content by using the information collected by the plurality of devices so as to provide the file name of high accuracy to the user.

The foregoing exemplary embodiments are merely exemplary and are not to be construed as limiting. The present disclosure can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of managing data by a server, the method comprising:
   receiving, from a user device, a user input for selecting a plurality of attributes of elements to be included in a file name of content and setting an arrangement order of the selected plurality of attributes, the selected plurality of attributes comprising a name of an object to be extracted from the content;
   generating a file name generation rule corresponding to a user account based on the selected plurality of attributes and the arrangement order of the selected plurality of attributes;
   receiving, from the user device, a signal requesting a content list corresponding to the user account;
   selecting the content related to the user account and the file name generation rule corresponding to the user account;
   performing image processing on the selected content to extract the object from the content and identify the extracted object based on a comparison between the extracted object and a plurality of images stored in a database;
   generating the file name of the content based on the file name generation rule; and
   providing the content list including the file name of the content to the user device.

2. The method of claim 1, further comprising:
   receiving the file name generation rule from another device in connection with the user account;
   associating the file name generation rule with the user account; and
   storing information that indicates the file name generation rule is associated with the user account.

3. The method of claim 1, wherein the generating the file name generation rule comprises setting a length limit of the file name.

4. The method of claim 3, wherein the generating the file name generation rule comprises setting the length limit of the file name based on a screen size of the user device.

5. The method of claim 1, further comprising:
   receiving, from the user device, a signal that requests for changing the file name generation rule to a new file name generation rule; and
   updating the file name of the content included in the content list based on the new file name generation rule.

6. The method of claim 1, wherein the generating of the file name comprises generating the file name of the content by using analysis information about the content, wherein the analysis information is stored in advance.

7. The method of claim 6, wherein the analysis information comprises at least one selected from attribute information extracted from the content, information about a device collecting the content, environmental information when the content is obtained, and user information corresponding to the user account.

8. The method of claim 6, further comprising:
   receiving the content from another device in connection with the user account;
   obtaining the analysis information about the content by analyzing the content; and
   storing the analysis information about the content.

9. The method of claim 8, wherein the another device in connection with the user account comprises at least one selected from a mobile terminal, a black box, a wearable device, a closed circuit television (CCTV), and a health information measuring device.

10. The method of claim 8, wherein the obtaining of the analysis information comprises obtaining the analysis information by using information collected by a plurality of devices in connection with the user account.

11. The method of claim 10, wherein the information collected by the plurality of devices comprises at least one piece of information selected from velocity information, luminance information, health information of a user of the user account, schedule information of the user, and social networking service (SNS) information of the user.

12. The method of claim 1, wherein the providing of the content list comprises:
   obtaining a thumbnail image corresponding to the content; and
   providing the content list including the file name and the thumbnail image to the user device.

13. The method of claim 1, wherein the providing of the content list comprises:
   classifying the content into at least one group according to a criterion that is set in advance; and
   generating a folder corresponding to the at least one group in the content list.

14. The method of claim 1, further comprising:
   receiving a search word from the user device;
   selecting the content corresponding to the search word and in connection with the user account; and
   providing the content list including the file name of the content corresponding to the search word to the user device.

15. The method of claim 14, further comprising:
   receiving selection information for selecting one file name from the content list from the user device; and
   transmitting the content corresponding to the selected file name to the user device.

16. The method of claim 1, further comprising providing the content to a storage space corresponding to a user account of a person included in the content or to a device of the person included in the content.

17. The method of claim 1, further comprising storing the content in a storage space corresponding to another user account in connection with the user account.

18. The method of claim 17, wherein the another account comprises account information of a second user who authorizes that a first user of the user account and the second user of the another account share the storage space.

19. A server comprising:
   a receiver configured to receive, from a user device, a user input for selecting a plurality of attributes of elements to be included in a file name of content and setting an arrangement order of the selected plurality of attributes, the selected plurality of attributes comprising a name of an object to be extracted from the content;
   a controller configured to:
   generate a file name generation rule corresponding to a user account based on the selected plurality of attributes and the arrangement order of the selected plurality of attributes, control the receiver to receive, from the user device, a signal requesting a content list corresponding to the user account,
select the content related to the user account and the file name generation rule corresponding to the user account,
perform image processing on the selected content to extract the object from the content and identify the extracted object based on a comparison between the extracted object and a plurality of images stored in a database, and
generate the file name of the content based on the file name generation rule; and
a transmitter configured to provide the content list including the file name of the content to the user device.

20. A non-transitory computer readable storage medium storing a program that is executable by a computer to perform the method of claim 1.

* * * * *